(12) United States Patent
Doi et al.

(10) Patent No.: US 6,694,046 B2
(45) Date of Patent: Feb. 17, 2004

(54) AUTOMATED COMPUTERIZED SCHEME FOR DISTINCTION BETWEEN BENIGN AND MALIGNANT SOLITARY PULMONARY NODULES ON CHEST IMAGES

(75) Inventors: Kunio Doi, Willowbrook, IL (US); Masahito Aoyama, Clarendon Hills, IL (US)

(73) Assignee: Arch Development Corporation, Chicago, IL (US)

( * ) Notice: Subject to any disclaimer, the term of this patent is extended or adjusted under 35 U.S.C. 154(b) by 298 days.

(21) Appl. No.: 09/818,831

(22) Filed: Mar. 28, 2001

(65) Prior Publication Data

US 2002/0172403 A1 Nov. 21, 2002

(51) Int. Cl.[7] .................................................. G06K 9/00
(52) U.S. Cl. ...................................... 382/130; 382/173
(58) Field of Search .............................. 382/100, 128, 382/129–134, 173, 224, 227, 242, 266; 378/18, 37, 62; 600/425; 128/897

(56) References Cited

U.S. PATENT DOCUMENTS

| | | | | |
|---|---|---|---|---|
| 4,873,707 A | * | 10/1989 | Robertson | 378/18 |
| 5,016,173 A | | 5/1991 | Kenet et al. | 382/132 |
| 5,235,510 A | | 8/1993 | Yamada et al. | 600/300 |
| 5,331,550 A | * | 7/1994 | Stafford et al. | 382/128 |
| 5,365,429 A | * | 11/1994 | Carman | 378/37 |
| 5,410,250 A | | 4/1995 | Brown | 324/309 |
| 5,574,799 A | * | 11/1996 | Bankman et al. | 382/132 |
| 5,627,907 A | * | 5/1997 | Gur et al. | 382/132 |
| 5,638,458 A | * | 6/1997 | Giger et al. | 382/132 |
| 5,709,206 A | | 1/1998 | Teboul | 382/128 |
| 5,815,591 A | | 9/1998 | Roehrig et al. | 382/130 |
| 6,078,680 A | | 6/2000 | Yoshida et al. | |
| 6,138,045 A | * | 10/2000 | Kupinski et al. | 600/425 |

OTHER PUBLICATIONS

Kawata et al., "Curvature Based Analysis of Pulmonary Nodules Using Thin–Section Images", IEEE 1998, pp. 361–363.*

Takagi et al., "Computerized Characterization Of Contrast Enhancement Patterns For Classifying Pulmonary Nodules", IEEE 2000, pp. 188–191.*

Qian et al., "Adaptive CAD Modules For Mass Detection In Digital Mammography", IEEE 1998, pp. 1013–1016.*

* cited by examiner

Primary Examiner—Jayanti K. Patel
(74) Attorney, Agent, or Firm—Oblon, Spivak, McClelland, Maier & Neustadt, P.C.

(57) ABSTRACT

An automated method for analyzing a nodule and a computer storage medium storing computer instructions by which the method can be implemented when the instructions are loaded into a computer to program the computer. The method includes obtaining a digital image including the nodule; segmenting the nodule to obtain an outline of the nodule, including generating a difference image from chest image, identifying image intensity contour lines representative of respective image intensities in a region of interest including the nodule, and obtaining an outline of the nodule based on the image intensity contours; extracting features of the nodule based on the outline; applying features including the extracted features to at least one image classifier; and determining a likelihood of malignancy of the nodule based on the output of the at least one classifier. In one embodiment, extracted features are applied to a linear discriminant analyzer and/or an artificial neural network analyzer, the outputs of which are thresholded and the nodule determined to be non-malignant if each classifier output is below the threshold. In another embodiment, a common nodule appearing in an x-ray chest image and a CT image is segmented in each image, features extracted based on the outlines of each segmented nodule in the respective x-ray chest and CT images, and the extracted features from the x-ray chest image and CT images merged as inputs to a common classifier, with the output of the common classifier indicating the likelihood of malignancy.

44 Claims, 23 Drawing Sheets

AUTOMATED COMPUTERIZED SCHEME FOR DISTINCTION BETWEEN BENIGN AND MALIGNANT SOLITARY PULMONARY NODULES ON CHEST IMAGES

The present invention was made in part with U.S. Government support under ARMY Grant #DAMD 17-96-1-6228 and USPHS Grants CA24806 and CA62625. The U.S. Government has certain rights in this invention.

BACKGROUND OF THE INVENTION

1. Field of the Invention

The invention relates generally to a method and system for the computerized analysis of radiographic images, and more specifically, to the determination of the likelihood of malignancy in pulmonary nodules using artificial neural networks (ANNs).

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348 as well as U.S. patent application Ser. Nos. 08/173,935; 08/398,307 (PCT Publication WO 96/27846); 08/536,149; 08/900,188; 08/900,189; 09/027,468; 09/028,518; 09/092,004; 09/121,719; 09/141,535; 09/471,088; 09/692,218; 09/716,335; 09/759,333; 09/760,854; and 09/773,636; PCT patent applications PCT/US99/24007; PCT/US99/25998; PCT/US00/41299; PCT/US01/00680; PCT/US01/01478 and PCT/US01/01479 and U.S. provisional patent application Nos. 60/193,072 and 60/207,401, all of which are incorporated herein by reference.

The present invention includes use of various technologies referenced and described in the above-noted U.S. Patents and Applications, as well as described in the references identified in the following LIST OF REFERENCES by the author(s) and year of publication and cross-referenced throughout the specification by reference to the respective number, in parentheses, of the reference:

LIST OF REFERENCES

1. N. F. Khouri, M. A. Meziane, E. A. Zerhouni, et al., "The solitary pulmonary nodule: assessment, diagnosis, and management," Chest 91, 128–133 (1987).
2. K. Nakamura, H. Yoshida, R. Engelmann, et al., "Computerized analysis of the likelihood of malignancy in solitary pulmonary nodules with use of artificial neural networks," Radiology 214, 823–830 (2000).
3. M. L. Giger, K. Doi, and H. MacMahon, "Image feature analysis and computer-aided diagnosis in digital radiography. 3. Automated detection of nodules in peripheral lung fields," Med. Phys. 15, 158–166 (1988).
4. X. W. Xu, and K. Doi, "Development of an improved CAD scheme for automated detection of lung nodules in digital chest images," Med. Phys. 24, 1395–1403 (1997).
5. H. P. Chan, K. Doi, C. J. Vyborny, et al., "Computer-aided detection of microcalcifications in mammograms methodology and preliminary clinical study," Invest. Radiol. 23, 664–671 (1988).
6. K. Doi, H. MacMahon, S. Katsuragawa, et al., "Computer-aided diagnosis in radiology: Potential and pitfalls," Eur. J. Radiol. 31, 97–109 (1999).
7. S. Katsuragawa. K. Doi, and H. MacMahon, "Image feature analysis and computer-aided diagnosis in digital radiography: Detection and characterization of interstitial lung disease in digital chest radiographs," Med. Phys. 15, 311–319 (1988).
8. M. Pilu, A. W. Fitzgibbon, and R. B. Fisher, "Ellipse-specific direct least-square fitting," Proc. of the IEEE International Conference on Image Processing, 599–602 (1996).
9. A. W. Fitzgibbon, M. Pilu, and R. B. Fisher, "Direct least squares fitting ellipses," Proc. of the 13th International Conference on Pattern Recognition, 253–257 (1996).
10. T. Ishida, S. Katsuragawa, T. Kobayashi, et al., "Computerized analysis of interstitial disease in chest radiographs: improvement of geometric-pattern feature analysis," Med. Phys. 24, 915–924 (1997).
11. U. Bick, M. L. Giger, R. A. Schmidt, et al., "A new single-image method for computer-aided detection of small mammographic masses," Proc. CAR—Computer Assisted Radiology, H. U. Lemke, K. Inamura, C. C. Jaffe, et. al., eds., 357–363 (1995).
12. Z. Huo, M. L. Giger, C. J. Vyborny, et al., "Analysis of spiculation in the computerized classification of mammographic masses," Med. Phys. 22, 1569–1579 (1995).
13. P. A. Lachenbruch, "Discriminant analysis," Chapters 1 and 2, pages 1–39, Hafner Press, 1975.
14. R. A. Johnson and D. W. Wichern, "Applied multivariate statistical analysis," Section 5.3, pages 184–188, Prentice Hall, New Jersey, 1992.
15. B. Sahiner, H. P. Chan, N. Petrick, et al., "Computerized characterization of masses on mammograms: The rubber band straightening transform and texture analysis," Med. Phys. 24, 516–526 (1998).
16. D. E. Rumelhart, G. E. Hinton, and R. J. Williams, "Learning internal representations by error propagation," In: D. E. Rumelhart, J. L. McClelland, eds. Parallel distributed processing: explorations in the microstructure of cognition. Vol 1. Cambridge, Mass.: MIT Press, 318–362 (1986).
17. Y. Jiang, R. M. Nishikawa, D. E. Wolverton, et al., "Malignant and benign clustered microcalcifications: automated feature analysis and classification," Radiology 198, 671–678 (1996).
18. C. E. Metz, "ROC methodology in radiologic imaging," Invest. Radiol. 21, 720–733 (1986).
19. C. E. Metz, B. A. Herman, and J. H. Shen, "Maximum likelihood estimation of receiver operating characteristic (ROC) curves from continuously distributed data," Stat. Med. 17, 1033–1053 (1998).

The entire contents of each related patent and application listed above and each reference listed in the LIST OF REFERENCES, are incorporated herein by reference.

Discussion of the Background

The differential diagnosis of pulmonary nodules on chest images is a difficult task for radiologists. Malignancy accounts for only 20% of all solitary pulmonary nodules on chest images (see Reference 1); however, most patients have been examined by computed tomography (CT) for a definite diagnosis. (See Reference 2) If radiologists could confirm confidently that many nodules are benign based on chest images, some unnecessary CT examinations would be avoided.

As disclosed in the above-cross-referenced International application No. PCT/US99/25998, in an effort to determine whether a nodule was benign or not, the outline of a nodule was drawn manually by radiologists. Various objective features were determined by use of the outline, and the likelihood of malignancy was determined by use of artificial neural networks (ANNs). Receiver operating characteristic (ROC) analysis indicated an encouraging result, that the Az value of the ANN output was greater than the average Az value obtained by radiologists in distinguishing between benign and malignant nodules. However, if a manual process were required for radiologists to draw the nodule outline, the practicality for utilizing the computer output as a second opinion to assist radiologists' image interpretation would be limited.

SUMMARY OF THE INVENTION

Accordingly, an object of this invention is to provide a new and improved automated computerized method and system for implementing a computer-aided diagnostic (CAD) technique to assist radiologists in distinguishing benign and malignant lung nodules.

Another object of this invention is to provide a new and improved automated computerized method and system for the analysis of the likelihood of malignancy in solitary pulmonary nodules on chest images, wherein manual identification of nodules is avoided or simplified.

Another object of this invention is to provide a new and improved method and system for the analysis of the likelihood of malignancy in solitary pulmonary nodules using image classifiers including a linear discriminate analyzer and artificial neural networks.

A further object of this invention is to provide a new and improved method and system for the analysis and determination of the likelihood of malignancy in solitary pulmonary nodules whereby it is possible to reduce the number of follow-up CT imaging ordered by radiologists.

Another object of this invention is to provide a computer program product including a storage medium storing a novel program for performing the steps of the method.

These and other objects are achieved according to the invention by providing (1) a new and improved method for analyzing a nodule, (2) computer readable medium storing computer instructions for analyzing a nodule, and (3) a system for analyzing a nodule. The method, on which the computer instructions and the system of the present invention are based, includes obtaining a digital chest image in which a location of a nodule is identified; generating a difference image from chest image; identifying image intensity contour lines representative of respective image intensities in a region of interest including the nodule; and segmenting the nodule based on the image intensity contours to obtain an outline of the nodule.

Upon obtaining an outline of the nodule, the method further includes generating objective measures corresponding to physical features of the outline of the nodule; applying the generated objective measures to at least one classier, which may be a linear discriminant analyzer and/or an artificial neural network (ANN); and determining a likelihood of malignancy of the nodule based on an output of the at least one classifier.

According to another aspect of the present invention, there is provided a novel automated computerized method, computer readable medium storing computer instructions for analyzing a nodule, and system for the analysis of the likelihood of malignancy in solitary pulmonary nodules on chest images, wherein the location of a nodule in a chest radiograph is first manually indicated in a chest image, and a difference image including the identified nodule is produced by use of filters and then represented in a polar coordinate system. The nodule is then segmented automatically by analysis of contour lines of the gray-level distribution based on the polar-coordinate representation.

Once the nodule is segmented, clinical parameters (age and sex) and plural image features determined from the outline or texture analysis for inside and outside regions of the segmented nodule are subjected to linear discriminant analysis (LDA). A combination of selected plural features is evaluated as input to an artificial neural networks (ANN). The results of classification by the LDA and ANN establish thresholds defining whether a nodule is benign or not.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Materials and Methods

Materials

The inventors employed a database consisted of fifty-five chest radiographs (33 primary lung cancers and 22 benign nodules), which were obtained with Kodak Lanex Medium/ OC screen-film systems at the University of Chicago Hospitals. The size of the nodules was less than 3 cm. The final diagnosis for the malignant nodules and most of the benign nodules was determined by pathologic examination. The diagnosis of some benign nodules was determined by validation of no change or a decrease in nodule size over an interval of 2 years.

The 33 primary lung cancers were divided into several diagnoses (26 adenocarcinomas, 3 squamous cell carcinomas, 1 small cell carcinoma, 1 carcinoid tumor, and 2 tumors of unknown subtype). The 22 benign nodules consisted of 12 granulomas, 7 inflammatory lesions, 2 pulmonary hamartomas, and 1 pulmonary infarction. The fifty-five chest radiographs were obtained from 33 women and 22 men (age range of 24–86 years, with a mean age of 58.5 years). These chest radiographs were digitized to 2000× 2000 matrix size with a 0.175 mm pixel size and a 10-bit gray scale by use of a laser scanner (Abe Sekkei, Tokyo, Japan).

Methods

1. Nodule Segmentation

Figure 10:
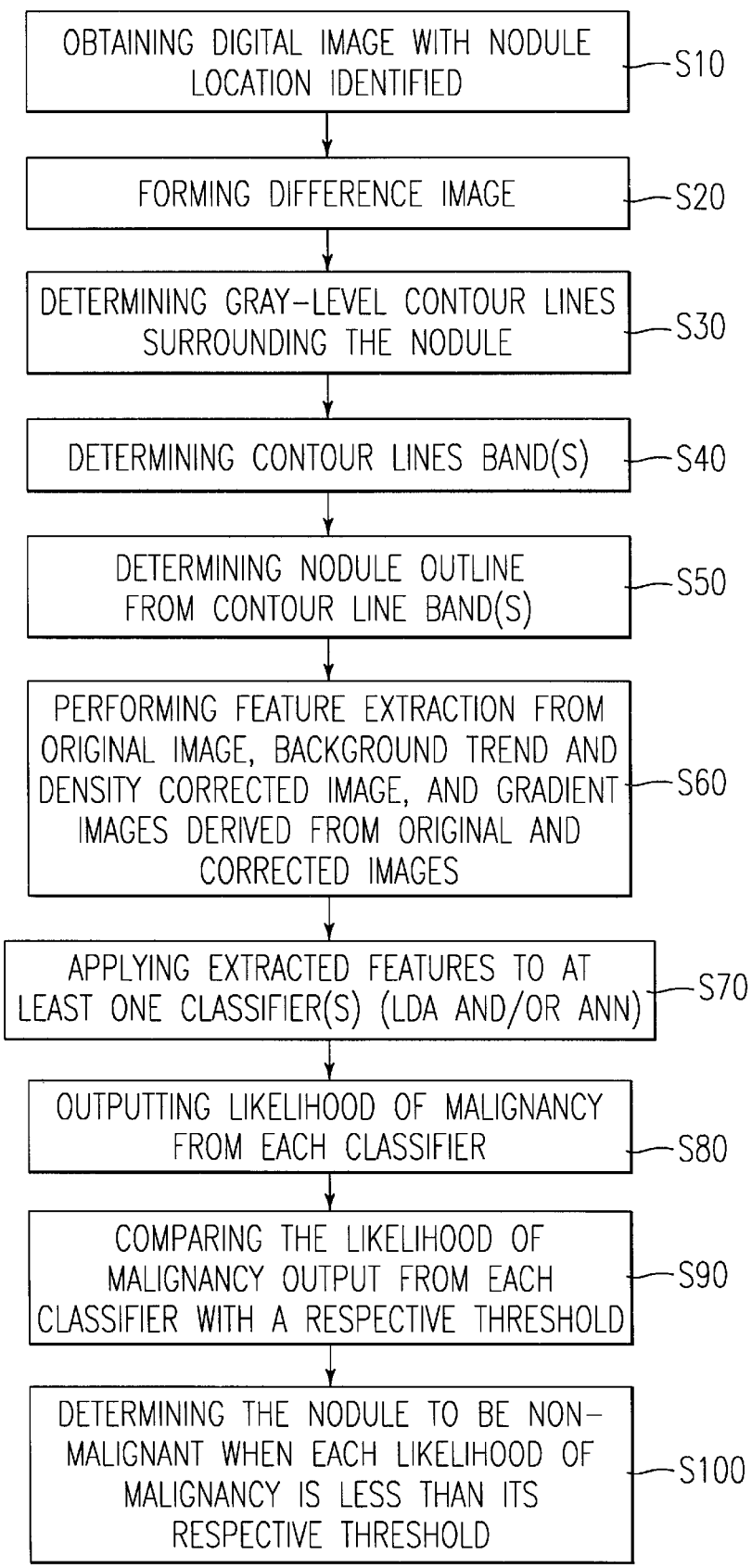
FIG. 10 is a schematic block diagram illustrating steps of the automated method of the present invention performed to determine the likelihood of malignancy of a nodule.

FIG. 10 illustrates the overall method of the present invention, which begins with obtaining a digital image with the location of a nodule identified (step S10). This can be accomplished by subjecting a chest radiograph to the nodule identification routines disclosed in the above cross-referenced U.S. Pat. Nos. 4,907,156; 5,289,374; 5,790,690; 6,111,862; and/or U.S. Pat. No. 6,141,4327, or any known automated technique for nodule location identification. Furthermore, in a typical application of the present invention, a radiologist may upon examining a chest radiograph decide that he/she would like to have a particular suspect region double-checked by a computer programmed to perform the steps of the invention. In that case, the radiologist need only manually identify the location of the suspected nodule in the radiograph, using a touch screen, mouse input, trackball input, or other such input mechanism. Thus, in step S10, the operation of the present invention begins with obtaining a digital image with the location of a nodule identified, either automatedly or by manual input from a radiologist.

Next, in step S20, a difference image is formed (see Reference 3 and U.S. Pat. No. 4,907,156), which is created by subtraction of a suppressed image obtained with a ring average filter from an enhanced image obtained with a matched filter. The difference image has a unique feature in that the nodule is selectively enhanced compared to the background structures, and thus the outline of the nodule in the difference image can be identified more reliably by computer than that in the original image. It should be noted that accurate segmentation of lung nodules on the original images is very difficult when the nodule is overlapped with ribs, which is commonly the case. The difference image technique has been used as an initial step for extracting candidates of lesions such as nodules in chest radiographs (see Reference 4) and microcalcifications in mammograms (see References 5 and 6) for computer-aided diagnostic (CAD) schemes.

Figure 1A:
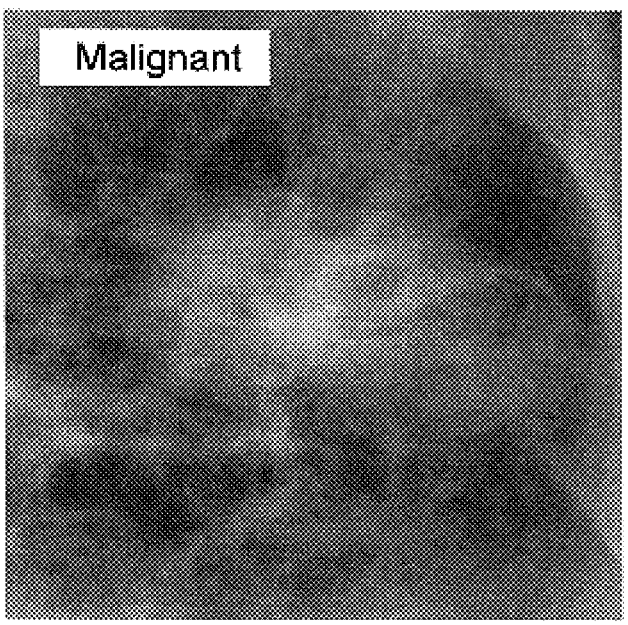
FIGS. 1(a), 1(b) and 1(c) are portions of posteroanterior chest radiograph images each including a malignant nodule.
Figure 1B:
Figure 1C:
Figure 1D:
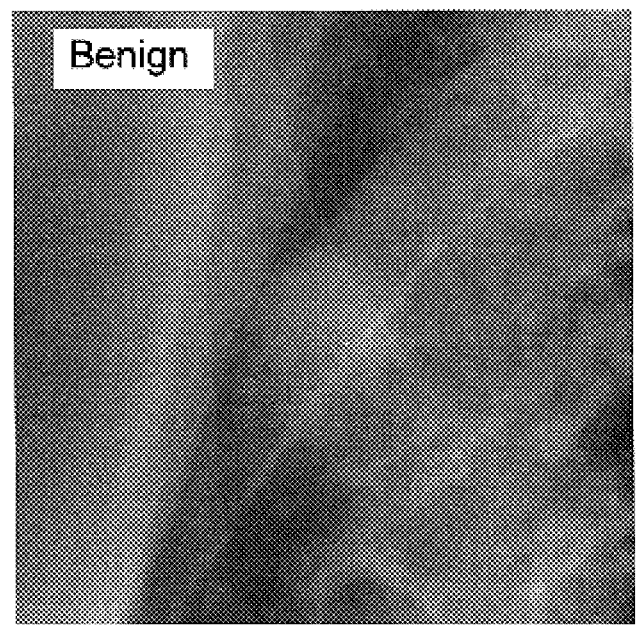
FIGS. 1(d), 1(e), 1(f) are portions of posteroanterior chest radiograph images each including a benign nodule.
Figure 1E:
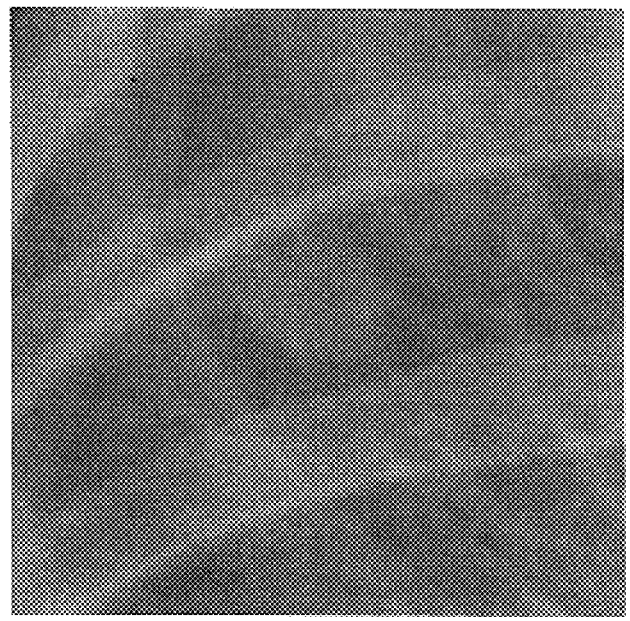
Figure 1F:
Figure 2A:
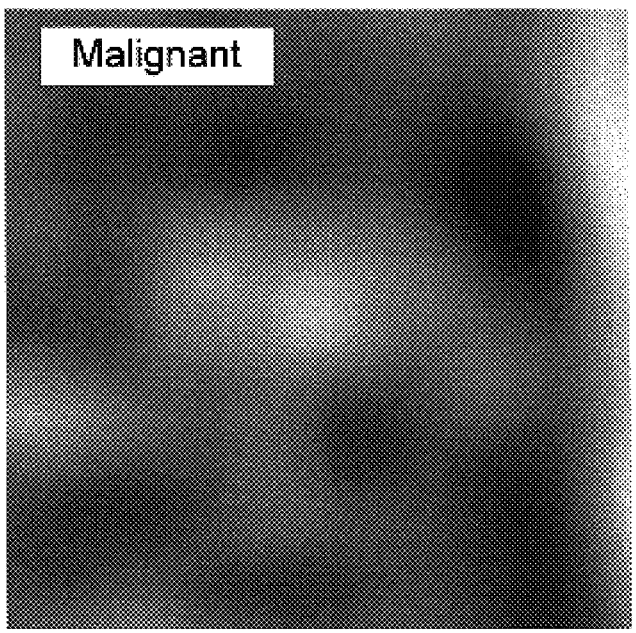
FIGS. 2(a), 2(b), 2(c), 2(d), 2(e) and 2(f) are difference images generated based on the images of FIGS. 1(a), 1(b), 1(c), 1(d), 1(e) and 1(f), respectively, wherein the contrast of the difference images is enhanced by factors ranging from 4.6 to 8.0 for illustration. These factors were determined by the normalization factor used for displaying the difference image in a 10-bit gray scale.
Figure 2B:
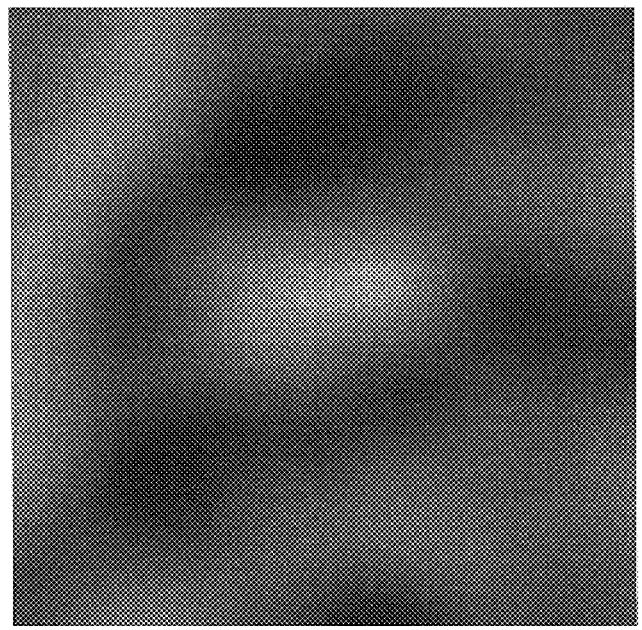
Figure 2C:
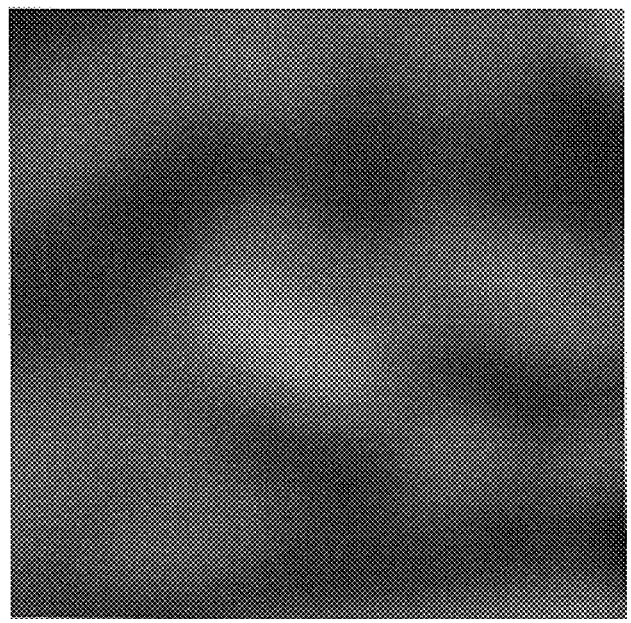
Figure 2D:
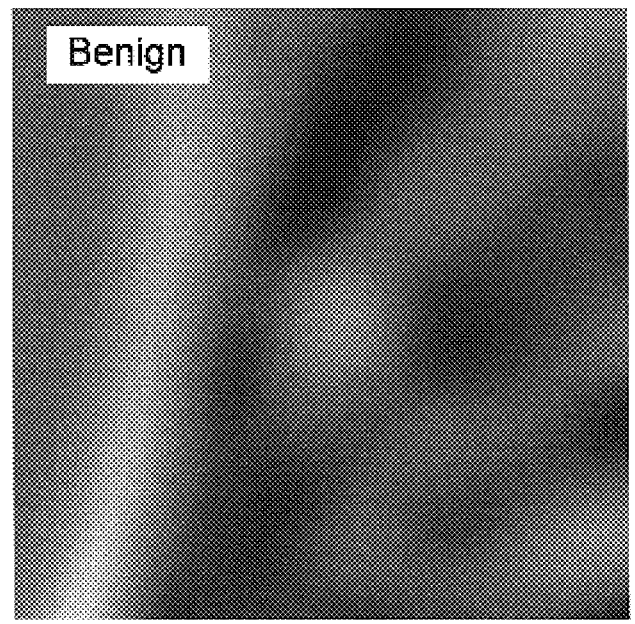
Figure 2E:
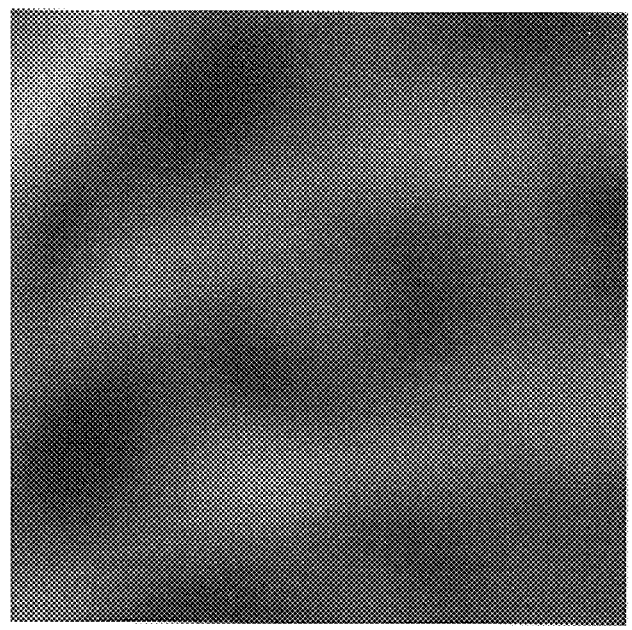
Figure 2F:
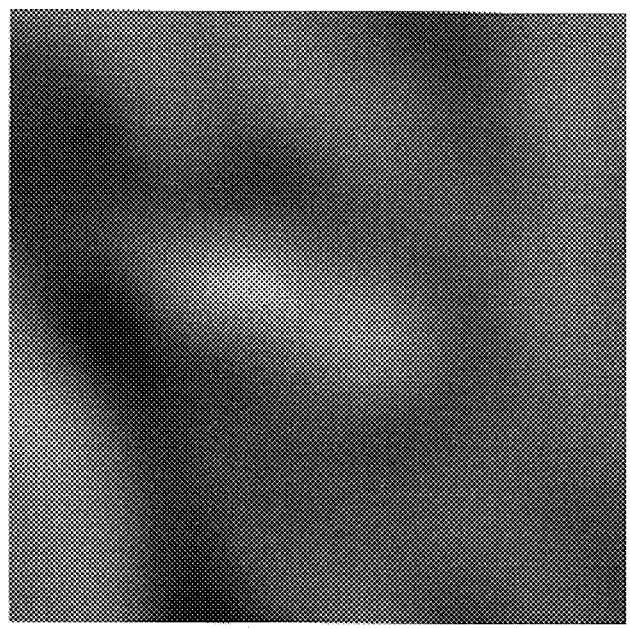
Figure 3A:
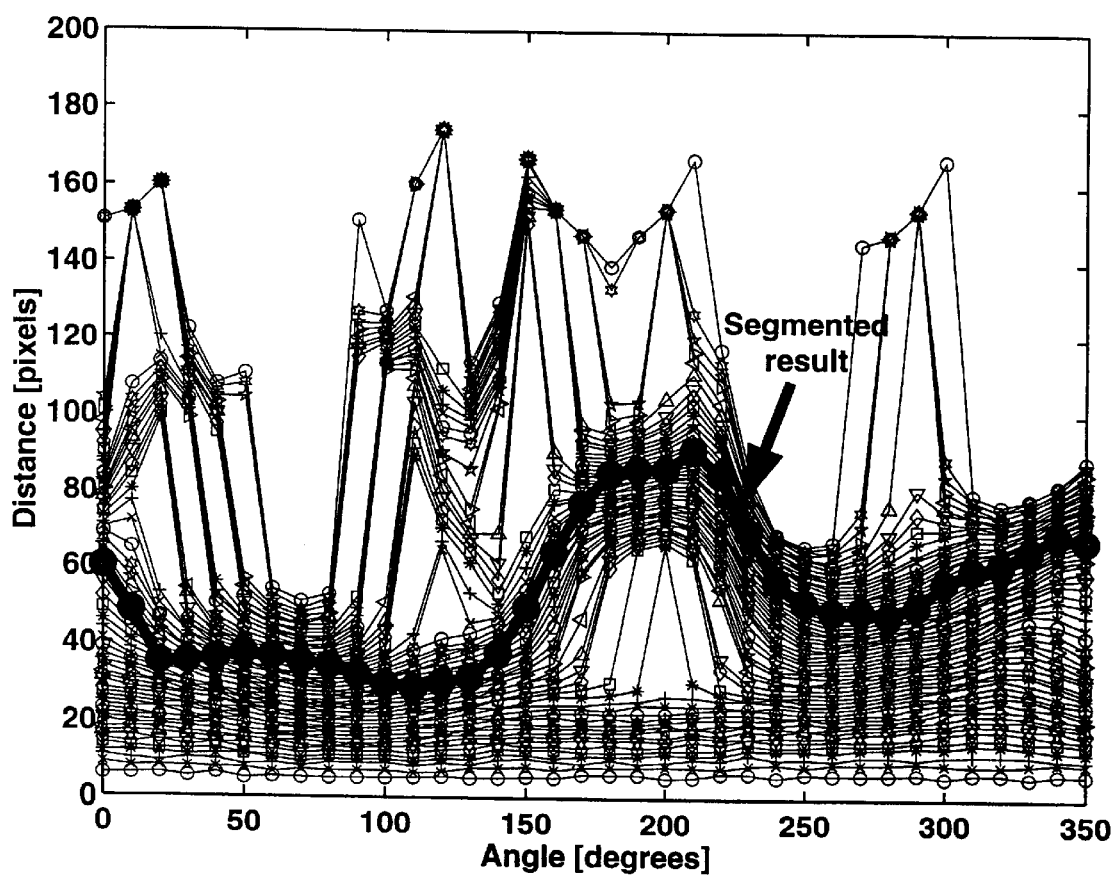
FIGS. 3(a) and 3(b) are graphs illustrating polar coordinate representations for (a) the malignant nodule of FIGS. 2(a), and (b) the benign nodule of FIG. 2(e), respectively, wherein thick curves show the segmented result obtained with the automated method of the present invention. The contrast of difference images is amplified by factors ranging from 4.6 to 8.0. These factors were determined by the normalization factor used for displaying the difference image in a 10 bit gray scale.
Figure 3B:
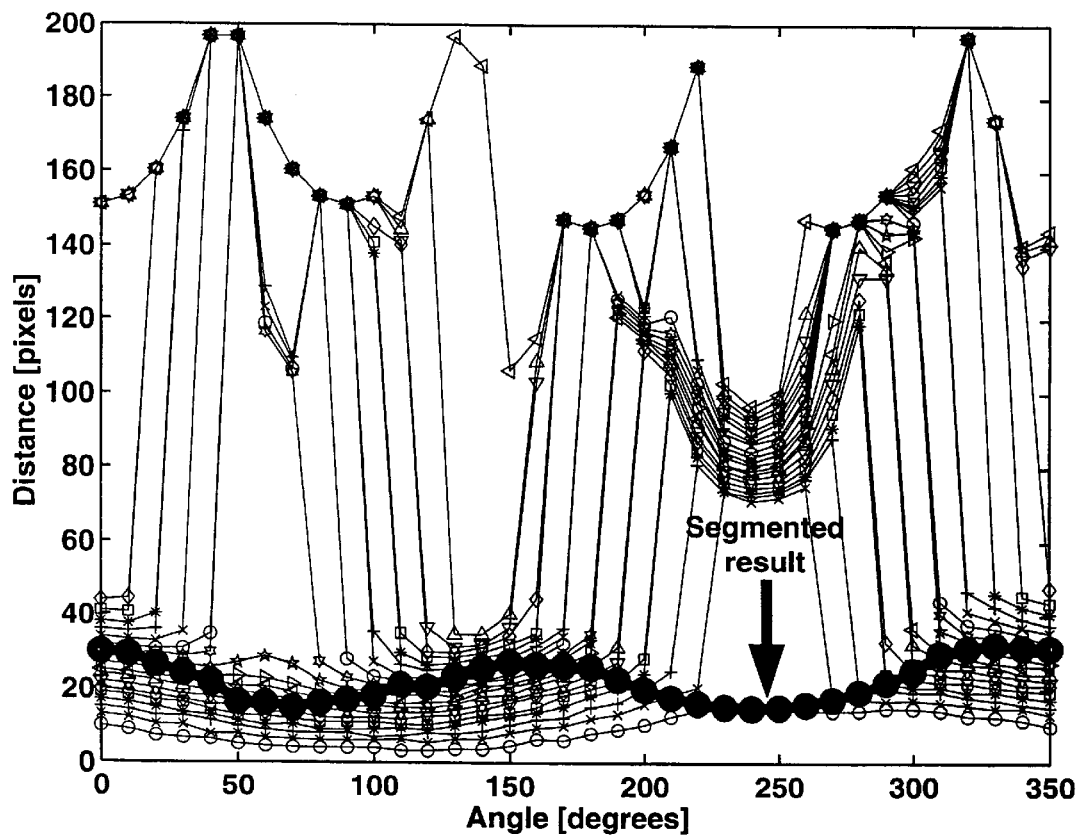
Figure 4A:
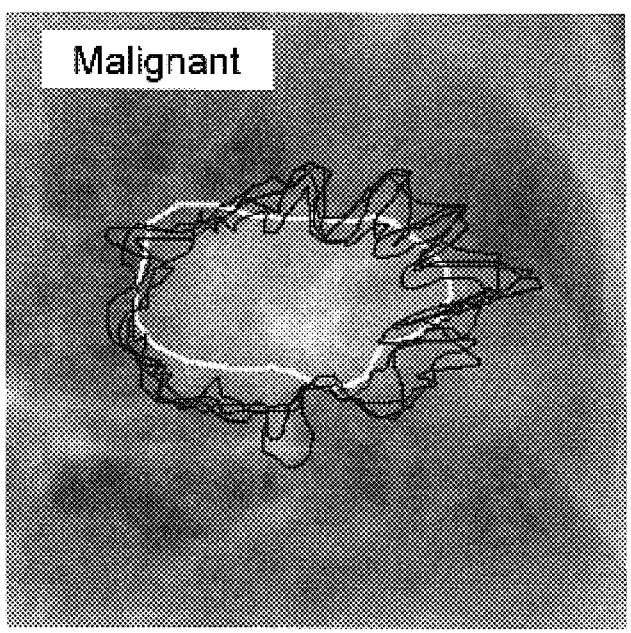
FIGS. 4(a), 4(b), 4(c), 4(d), 4(e) and 4(f) respectively illustrate the images of FIGS. 2(a), 2(b), 2(c), 2(d), 2(e) and 2(f) for comparison of the results by automated nodule segmentation according to the present invention (white contours) and the outlines drawn by four radiologists (black contours) for malignant and benign nodules.
Figure 4B:
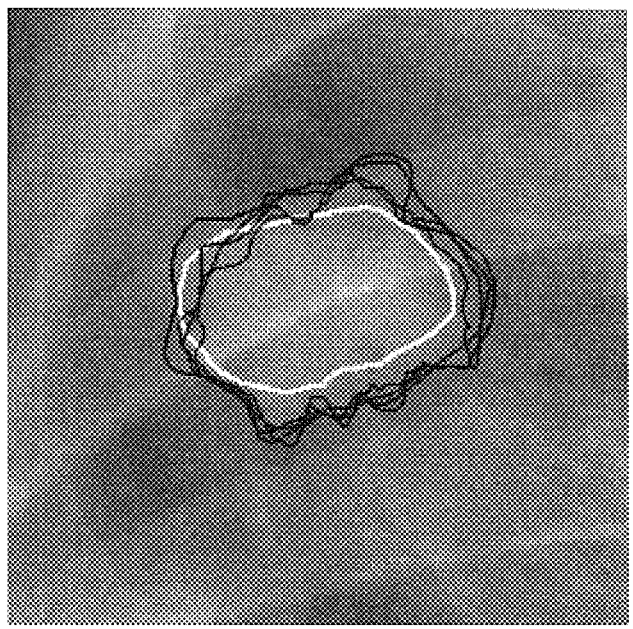
Figure 4C:
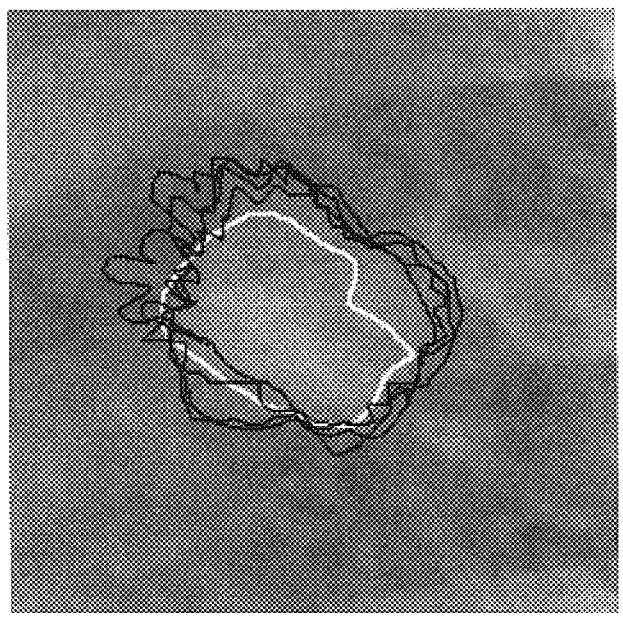
Figure 4D:
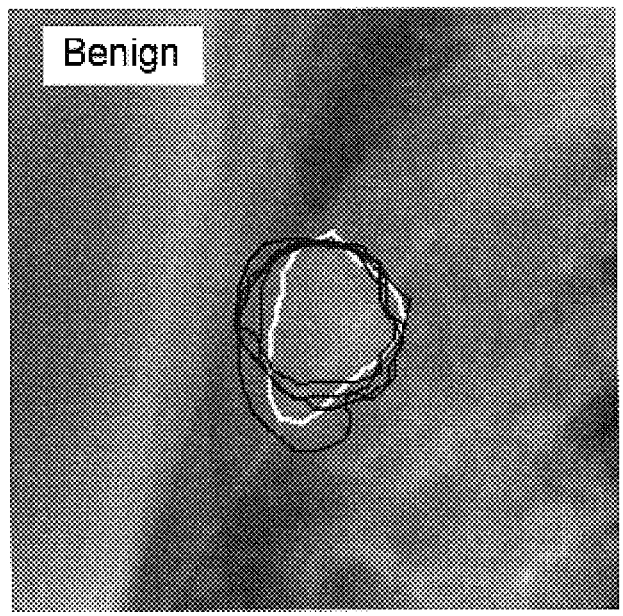
Figure 4E:
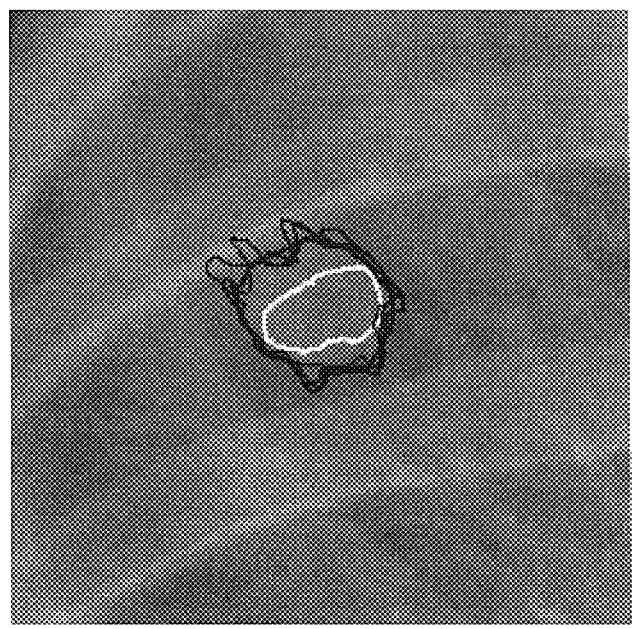
Figure 4F:
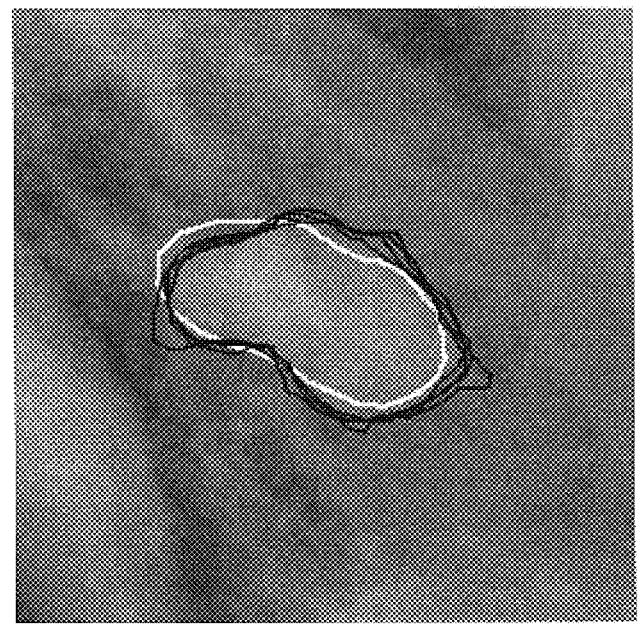
Figure 5A:
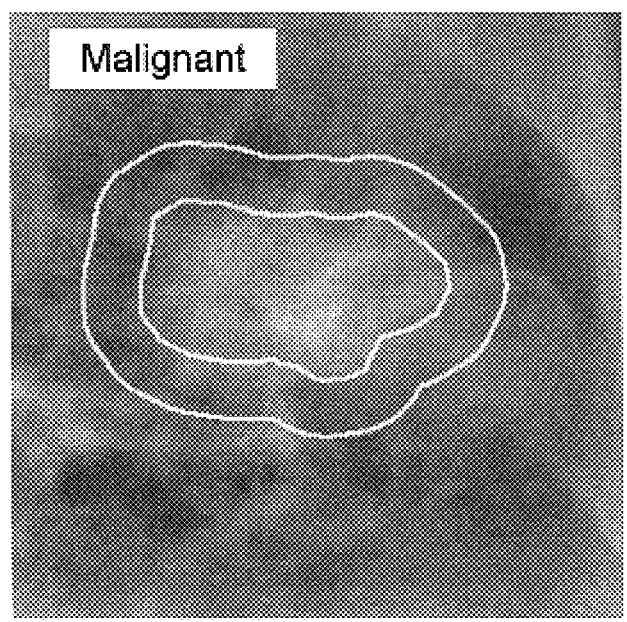
FIGS. 5(a), 5(b), 5(c), 5(d), 5(e) and 5(f) respectively illustrate the images of FIGS. 2(a), 2(b), 2(c), 2(d), 2(e) and 2(f) in which are generated inside and outside regions of the segmented nodules for malignant and benign nodules.
Figure 5B:
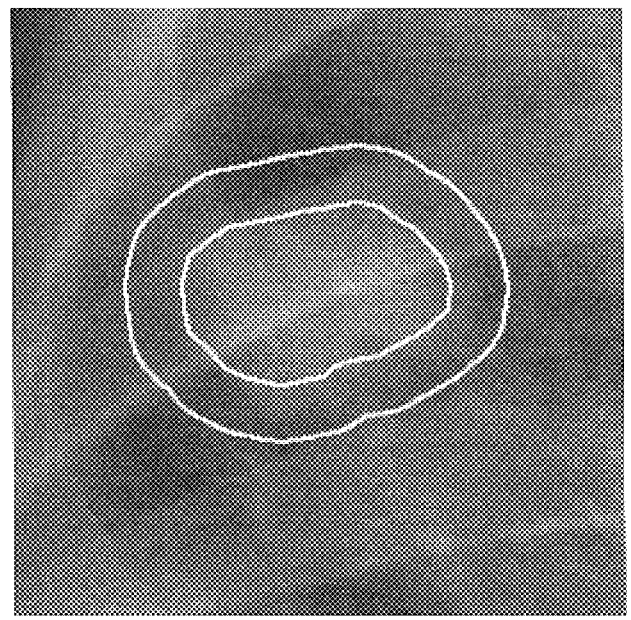
Figure 5C:
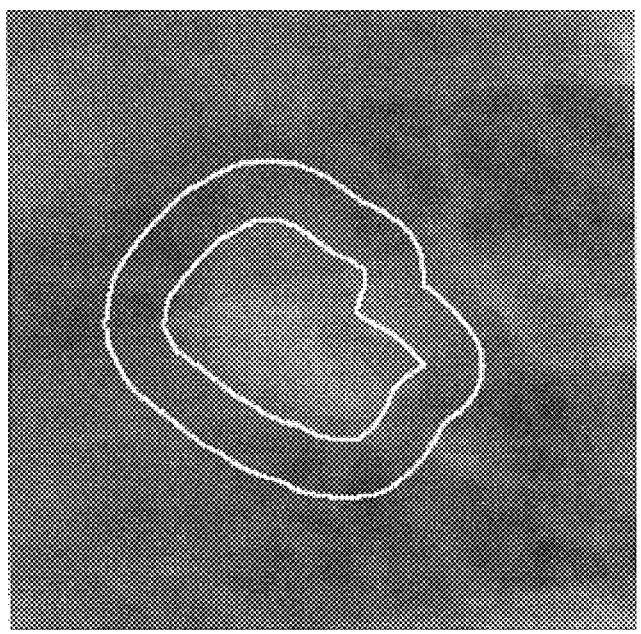
Figure 5D:
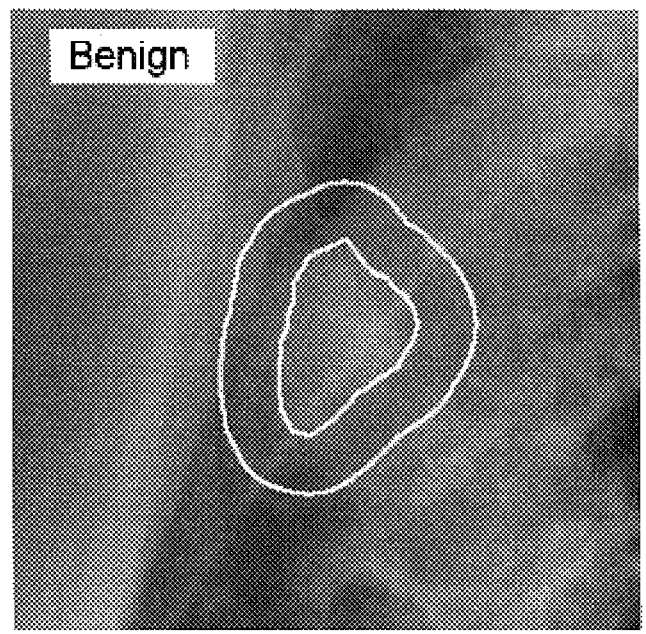
Figure 5E:
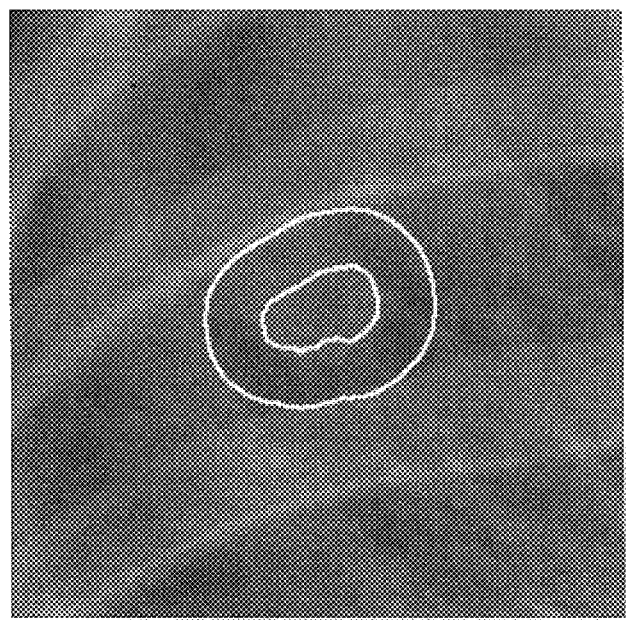
Figure 5F:
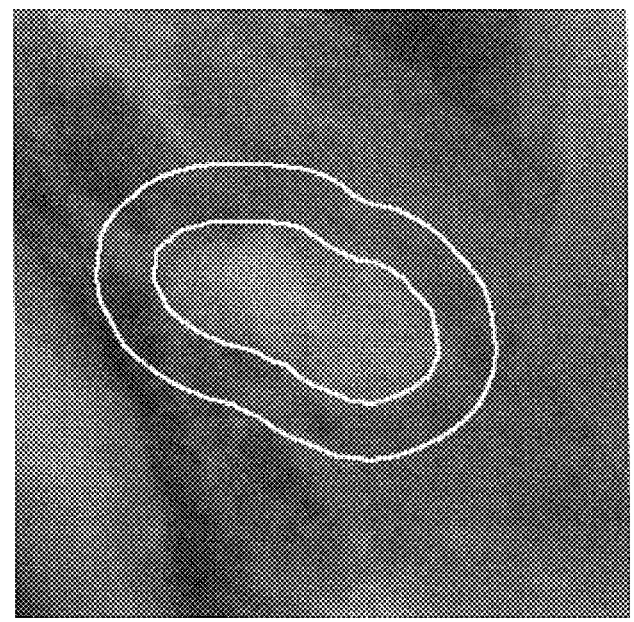

FIGS. 1(a)–1(c) show three malignant solitary pulmonary nodules and FIGS. 1(d)–1(f) show three benign solitary pulmonary nodules, which are located at the center of regions of interest (ROIs). FIGS. 2(a)–2(f) show respective difference images, obtained in step S20 of FIG. 10, for each of the images of FIGS. 1(a)–1(f) as shown in FIG. 2. According to a preferred embodiment of the method for automated nodule segmentation of the present invention, a polar coordinate analysis is performed whereby the ROI (300×300 matrix size) for a nodule in the difference image is then converted to a polar coordinate system, as illustrated in FIGS. 3(a) and 3(b). Presumably other coordinate systems may be employed, but the use of a polar coordinate system is convenient for the generation of contour lines according to the present invention, and is therefore preferred.

The polar coordinate representations in FIGS. 3(a) and 3(b) were created by defining the center of the ROI, which is generally at the largest pixel value. In performing the method shown in FIG. 10, in the next step S30, gray-level contour lines are then drawn at various gray levels in the difference image, with an increment of 10 gray levels below the largest pixel value. In the examples shown in FIGS. 3(a) and 3(b), the distance from the center to the contours in the radial direction at every 10 degrees was determined. The polar coordinate representation in FIGS. 3(a) and 3(b) were created by plotting of the radial angle on the horizontal axis and the radial distance on the vertical axis. It should be noted that this representation of contour lines can indicate some image features such as the edges of a nodule, rib edges, and gradual changes in gray-level distributions. For example, a sharp edge due to the edge of a nodule can be recognized by many contour lines in a short distance, and a gradual change in pixel values can be recognized by a large gap or a small number of contour lines within a given distance. A very sharp edge due to a rib edge is indicated by a sudden large change in pixel values or by many indistinguishable lines in a narrow region. Therefore, the outline of a nodule can be extracted by the analysis of contour lines represented on a polar coordinate system, i.e., by connecting to one curve based on a number of narrow regions with many contour lines.

In the next step S40, nodule segmentation proceeds by identifying contour line bands, each band being a narrow region with many contour lines. Specifically, a band in the example shown in FIGS. 3(a) and 3(b) is defined as a region with three or more continuous contour lines where the distance between adjacent contour lines is less than 6 pixels (1.05 mm). Then, in step S50 of FIG. 10, the outline of the nodule is determined based on the bands identified in step S40. In particular, nodule edges are determined at the upper 70% location from the bottom to the top of the band, which was determined empirically. If this distance is greater than 100 pixels (17.5 mm) from the center, then it is determined that no clear nodule edges exist. If there are two bands over the same angles, the nodule edge is considered to be included in the band closer to the contour lines, which had been defined from adjacent one-band regions. On the other hand, if nodule edges in some radial directions can not be found, the nodule edges for all 36 radial directions is determined by interpolation of the nodule edges defined by the method above.

The thick curves for the two nodules in FIGS. 3(a) and 3(b) show segmented results obtained by this method, which were then transformed to the outline of nodules in the original image. For the malignant case in FIG. 3(a), a stronger edge was selected as an appropriate nodule edge in the upper one of two bands between 160 and 230 degrees. For the benign case in FIG. 3(b), a parabola-shaped edge between 190 and 290 degrees corresponds to the strong rib edge immediately above the nodule in FIG. 1(e).

FIGS. 4(a)–4(f) show comparisons of the six segmented nodule regions (white lines) and the outlines drawn manually by four radiologists (black lines), which indicate a relatively large variation, for each of the difference images of FIGS. 2(a)–2(f). The automated segmentation result is similar in general to the hand-drawn outlines obtained by radiologists, although the two types of outlines are quite different in their appearance. It is seen that the automated segmentation method does not simulate exactly the result obtained by the manual method, but provides an approximate region, which would be adequate for the subsequent analysis. Feature extraction Once the nodule outline is determined in step S50 of FIG. 10, the next step S60 to be performed is feature extraction. In an effort to evaluate prospective features to be extracted, a study was performed in which eighty-one features were examined. In addition to two clinical parameters (age and sex), seventy-nine image features were determined from the outline or texture analysis for inside and outside regions of the segmented nodule. Feature values based on texture analysis were determined by use of four different kinds of images, i.e., the original image, the background trend and the density-corrected image (see Reference 7), and their corresponding edge gradient images, which were obtained by use of a Sobel filter. The mask size of the Sobel filter was 21×21 pixels, which appeared to provide nodule edges conspicuously in the edge-gradient images. The seventy-nine image features included seven features based on the outline, and two features based on texture analysis of the original image and the corrected image (2×2=4), six features based on texture analysis of two edge-gradient images (6×2=12), four features based on texture analysis of four different kinds of images (4×4=16), and ten features based on the relationship between the two histograms in the inside and outside regions of the segmented nodule for four different kinds of images (10×4=40).

FIGS. 5(a)–5(f) show the inside and outside regions of six segmented nodules of FIGS. 4(a)–4(f), respectively. The inner and outer white lines indicate the inside and outside regions, respectively. The width of the outside region was 5 mm, which was determined empirically in this study.

Figure 6A:
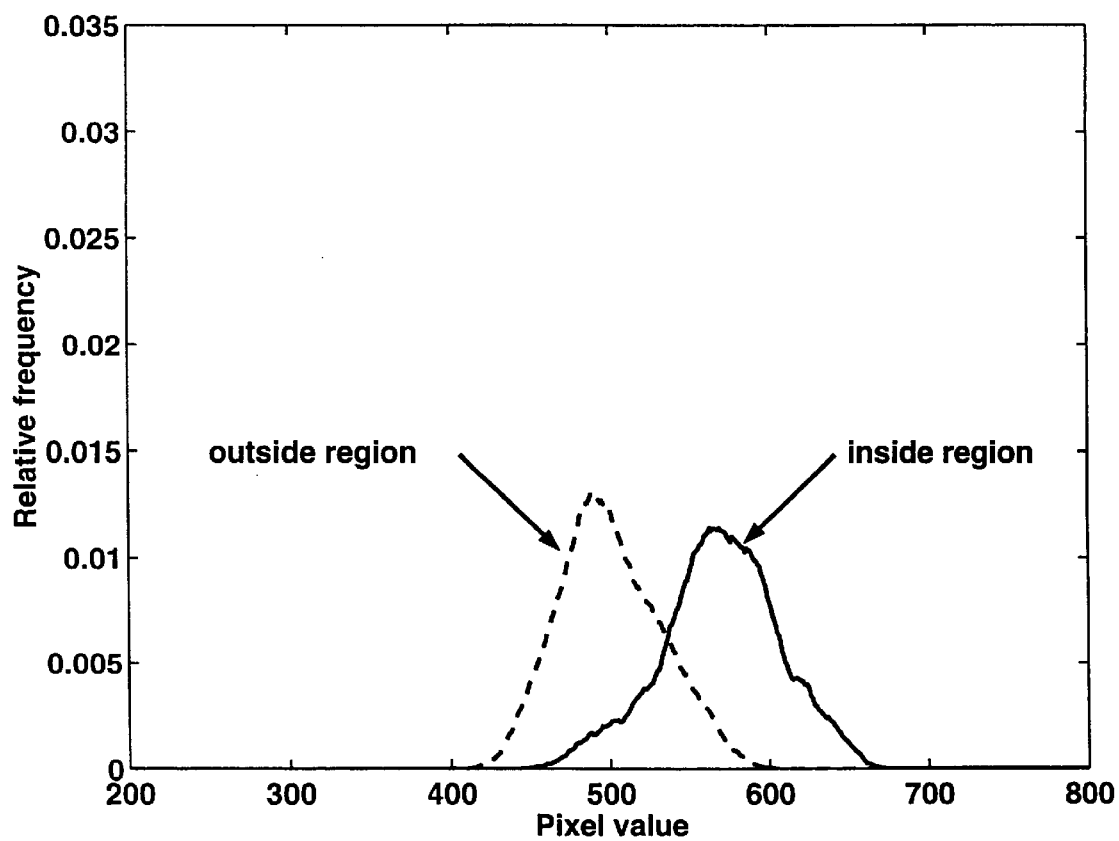
FIGS. 6(a) and 6(b) are graphs illustrating gray-level histograms for inside and outside regions of the segmented nodule on the background trend and density-corrected image for (a) the malignant nodule of FIGS. 5(a), and (b) the benign nodule of FIG. 5(e), respectively.
Figure 6B:
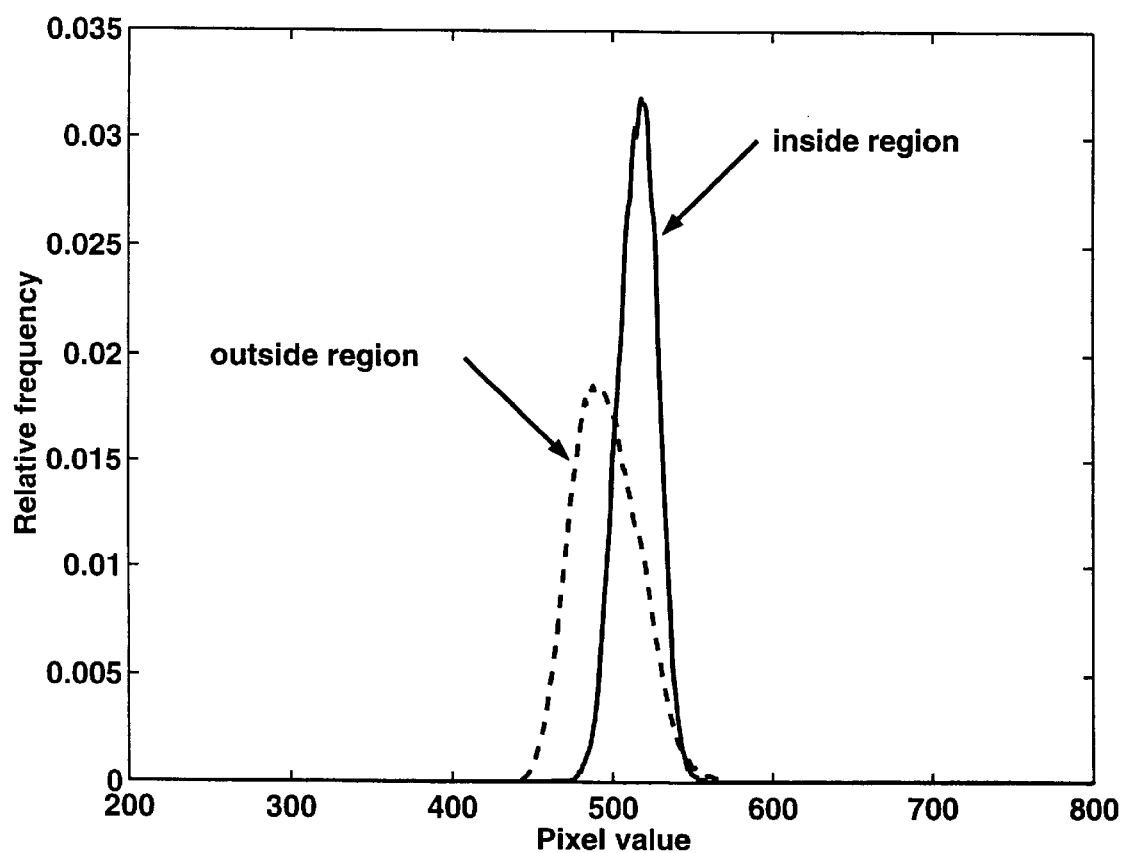

FIGS. 6(a) and 6(b) show gray-level histograms of two nodules for the inside and outside regions of the segmented nodule on the corrected image. Malignant nodules generally have a lower peak and wider width in histograms, as shown in FIG. 6(a) than does the histogram of a benign nodule, as shown in FIG. 6(b). Moreover, the difference between the mean pixel values of histograms for the inside and the outside regions for malignant nodules is generally larger than that for benign nodules.

Features extracted included the effective diameter of a nodule outline, defined by the diameter of a circle with the same area as that of the outline. The degree of circularity was defined by the fraction of the overlap area of the circle with the nodule outline. The degree of ellipticity was defined in the same manner as the degree of circularity, by use of an ellipse instead of a circle fitted to the nodule outline. (See References 8 and 9) The degree of irregularity was defined by 1 minus the perimeter of the circle divided by the length of the nodule outline, whereas the degree of elliptical irregularity was computed by use of the perimeter of the fitted ellipse. The root-mean-square variation and the first moment of the power spectrum, which was obtained by use of Fourier transformation of the distance from the nodule outline to the fitted ellipse, were also defined.

The magnitude of the line pattern components around the nodule was determined by use of a line enhancement filter (see Reference 10), in a direction within 45 degrees of the radial line from the center of the ROI. The magnitude of edges around nodules was examined by the mean gradient. The radial gradient index was computed by the mean absolute value of the radial edge gradient projected along the radial direction (see Reference 11). The tangential gradient index was also computed by the mean absolute value of the tangential edge gradient projected along the tangential direction. The mean pixel value and the relative standard deviation were defined for both the inside and outside regions of the segmented nodule.

The overlap measures between two histograms were defined by the overlap area of gray-level histograms between the inside and outside regions of the segmented nodule (FIG. 6). In addition, the difference of the mean pixel value, the pixel value at the peak, the peak value, full width at half maximum (FWHM) (see Reference 12), and full width at tenth maximum for gray-level histograms for the inside and outside regions of the segmented nodules were used as features.

Feature Selection

Figure 7A:
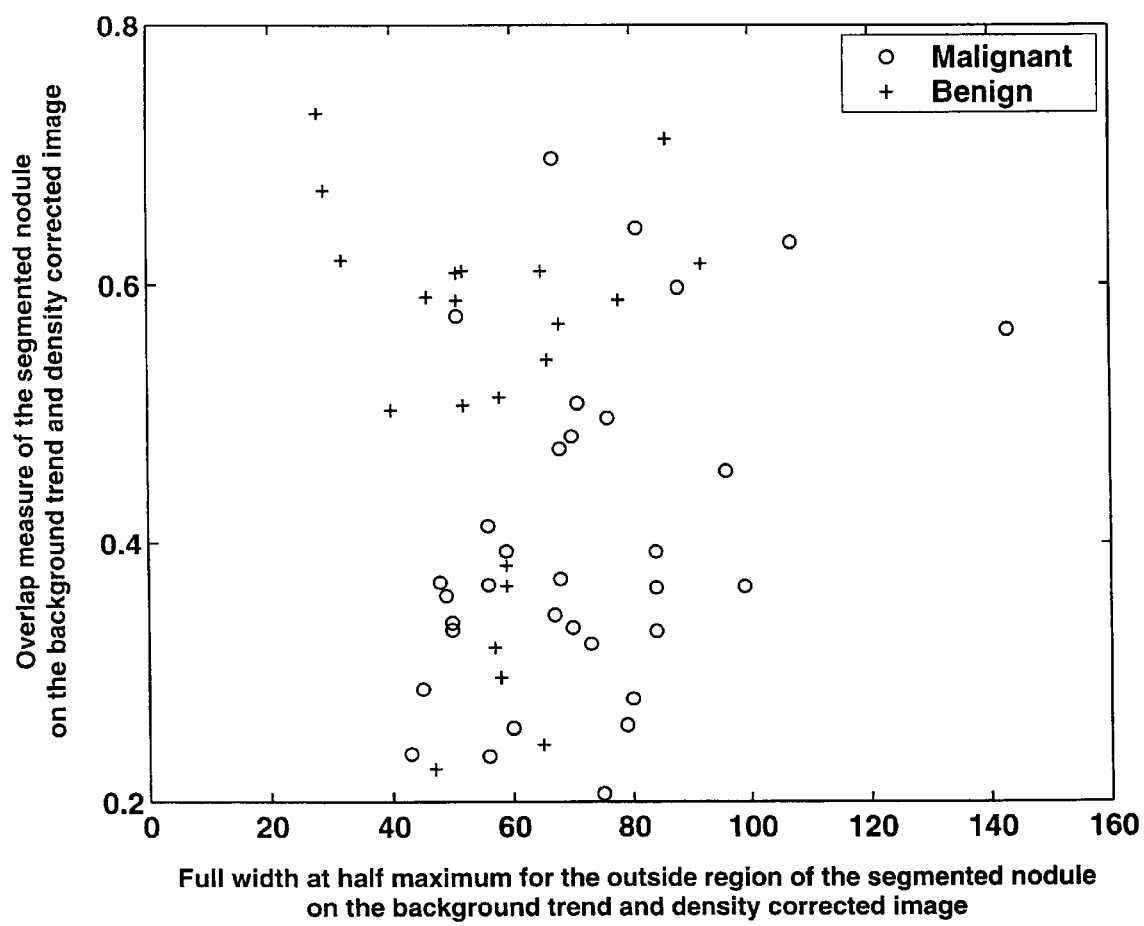
FIGS. 7(a) and 7(b) are graphs illustrating the relationship between two selected features: (a) The full width at half maximum of the histogram for the outside region and the overlap measure on the background trend and density corrected image, and (b) The full width at half maximum of the histogram for the outside region and the contrast on the original image, respectively.
Figure 7B:
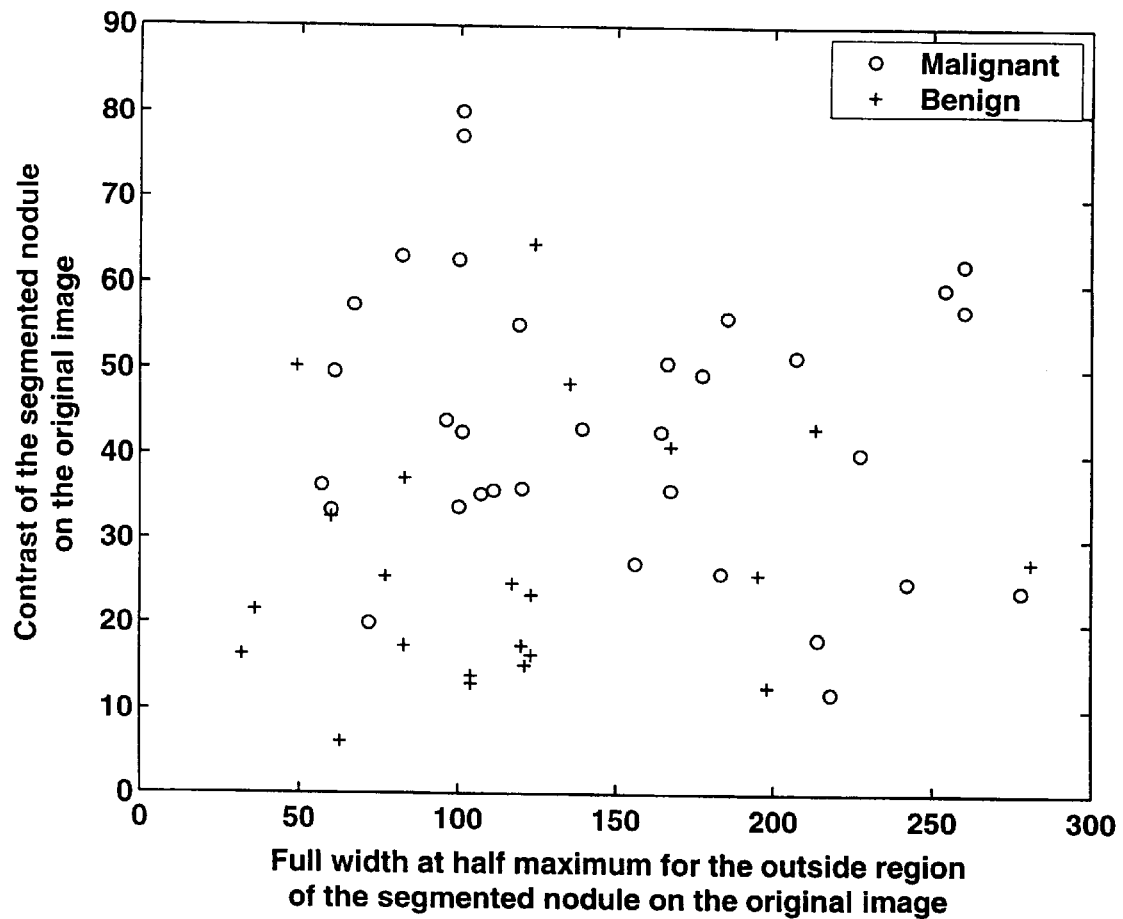

FIGS. 7(a) and 7(b) shows the relationship of two features for benign and malignant nodules. Although the distributions in FIGS. 7(a) and 7(b) indicate a considerable overlap between benign and malignant nodules, the result appears to indicate the possibility for distinction between benign and malignant nodules. In particular, FIG. 7 (a) shows the relationship between the FWHM for the outside region and the overlap measure on the background trend and the density-corrected image. The FWHM for malignant nodules tends to be greater than that for benign nodules, and the overlap measure for malignant nodules tends to be less than for benign ones (see FIGS. 6(a) and 6(b)). FIG. 7(b) shows the relationship between the FWHM for the outside region and the contrast on the original image. The FWHM of malignant nodules tends to be greater than that of benign ones, and the contrast of malignant nodules tends to be greater than that of benign ones, which is similar to the result shown in FIG. 7(a).

Referring again to FIG. 10, upon completion of feature extraction, the selected extracted features in step S70 are applied to at least one classifier, which determines a likelihood of malignancy result and outputs the result in step S80.

In the study performed by the inventors, a combination of seven features was selected based on linear discriminant analysis (LDA) (see Reference 13) by use of a round-robin test together with knowledge about benign and malignant nodules such as the results shown in FIGS. 7(a) and 7(b). Because computation on all combinations of seven features for all eighty-one features is not practical, the inventors employed Wilks' lambda, which is defined by the ratio of within-group variance to the total variance (see Reference 14), and the F-value, which is a cost function based on Wilks' lambda, to find an initial combination, as a seed, with LDA. A feature combination was found by an iterative procedure, where features are added or removed one-by-one by use of two thresholds on the F-value, one for removal and another for addition (see Reference 15). In the inventors' study, the same threshold for removal and addition was employed. The number of selected features depends on this threshold. For example, when the threshold level decreased from 3 to 2 to 1, the number of selected features increased from 5 to 7 to 11, respectively, with corresponding Az values of 0.835, 0.864, and 0.852. Therefore, the number of features used in this study was selected as seven, because of the highest Az value. Many different combinations of several features were repeatedly tried for appending and deleting the preselected seven features based on knowledge about benign and malignant nodules. The final combination consisted of (1) age of the patient, (2) degree of irregularity of the contour, (3) root-mean-square variation of the power spectrum of the nodule contour (see U.S. provisional application No. 60/108,167 and its corresponding PCT application), (4) overlap measure in a background trend and the density-corrected image derived from the original image, (5) FWHM for the inside region of the segmented in a background trend and the density-corrected image derived from the original image, (6) the contrast of the segmented nodule on the background trend and the density-corrected image derived from the original image, and (7) the contrast of the segmented nodule on the original image, which provided an Az value of 0.886.

Artificial Neural Network (ANN) and Linear Discriminant Analysis (LDA)

An ANN and LDA were used as classifiers of features in the inventors' study. A three-layer, feed-forward ANN with back-propagation algorithms (see Reference 16) was used. Because the ANN requires a long computational time for training, LDA was employed as a quick way to preexamine the effectiveness of the selected seven features. The seven features yielding relatively high Az values by use of LDA were then used as input data to the ANN. This ANN had 7 input units, 4 hidden units, and one output unit. The number of hidden units was selected to be the average of the numbers of input units and output units. The input data were normalized between 0 and 1.0. The output value of the ANN represents the likelihood of malignancy, with 1.0 for malignancy and 0 for benignancy. A round-robin (leave-one-out) test (see Reference 17) was used for training and testing of the ANN and also of LDA. In this method, training was carried out for all cases except one in the database, and the one case not used for training was applied for testing with the trained ANN. This procedure was repeated until every case in the database was used once. LDA separates benign from malignant nodules by use of a hyperplane. The output value of LDA represents the distance of either a benign or a malignant nodule from the hyperplane. The output value of the LDA is normalized as the likelihood of malignancy such that the minimum and the maximum value correspond to 0 and 1.0, respectively. The performance of the automated computerized scheme was evaluated by use of ROC analysis (see Reference 18). The area under the ROC curve, Az, was used as a measure of performance. The LABROC4 program (see Reference 19) was used for creating the ROC curves.

Results

Figure 8:
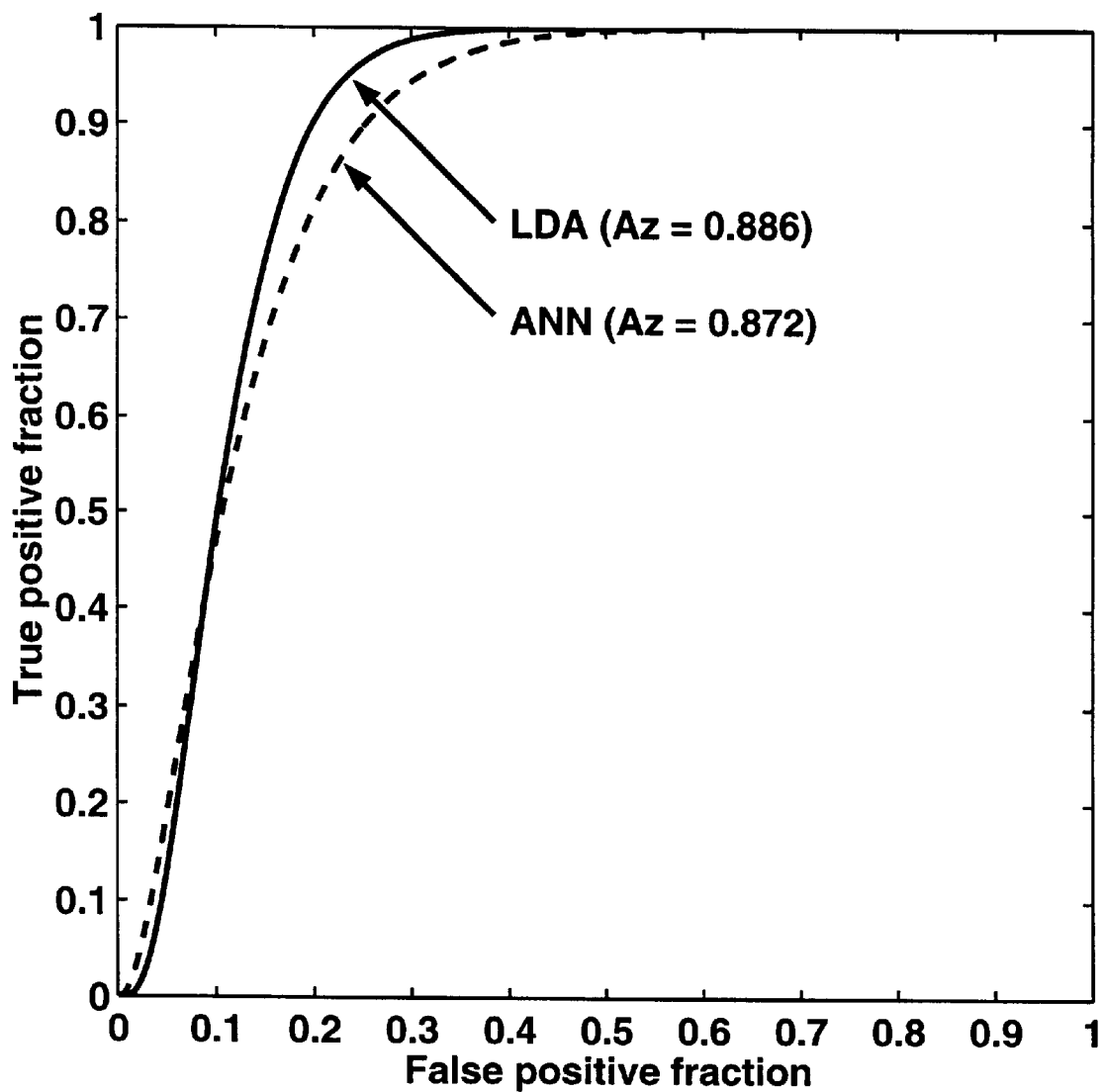
FIG. 8 is a graph illustrating ROC curves obtained by use of an ANN and a LDA with seven features for distinction between benign and malignant nodules.

In the study performed by the inventors, in performing step S70 of FIG. 10 the selected seven features were applied to an ANN classifier and to an LDA classifier. FIG. 8 shows two ROC curves obtained with the ANN and LDA, each of which provided the largest Az for distinguishing between benign and malignant nodules by use of the automated computerized method of the invention. The following Table 1 shows the comparison of Az values obtained with the ANN and LDA classifiers for several different combinations of features which provided Az values greater than or equal to 0.855:

TABLE 1

| Feature Combination | Az for ANN | Az for LDA |
| --- | --- | --- |
| a(1,2,3,4,5,6,7) | 0.872 | 0.871 |
| b(1,2,3,4,5,7,8) | 0.862 | 0.877 |
| c(1,2,3,4,5,8,9) | 0.861 | 0.886 |
| d(1,2,3,4,6,7,10) | 0.861 | 0.874 |
| e(1,2,3,4,5,8,11) | 0.856 | 0.870 |
| f(1,2,3,4,5,7,12) | 0.855 | 0.871 |

In Table 1, features referenced are: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (6) FWHM for the inside region of the segmented nodule on the background trend and the density-corrected image derived from the original image, (7) FWHM for the inside region on the original image, (8) contrast of the segmented nodule on the background trend and the density-corrected image derived from the original image, (9) contrast of the segmented nodule in a background trend and the density-corrected image derived from the original image, (10) degree of circularity of the nodule outline, (11) relative standard deviation for outside region of the segmented nodule on the background trend and the density-corrected image derived from the original image, and (12) mean pixel value for inside region of the segmented nodule on the background trend and the density-corrected image derived from the original image.

Figure 9A:
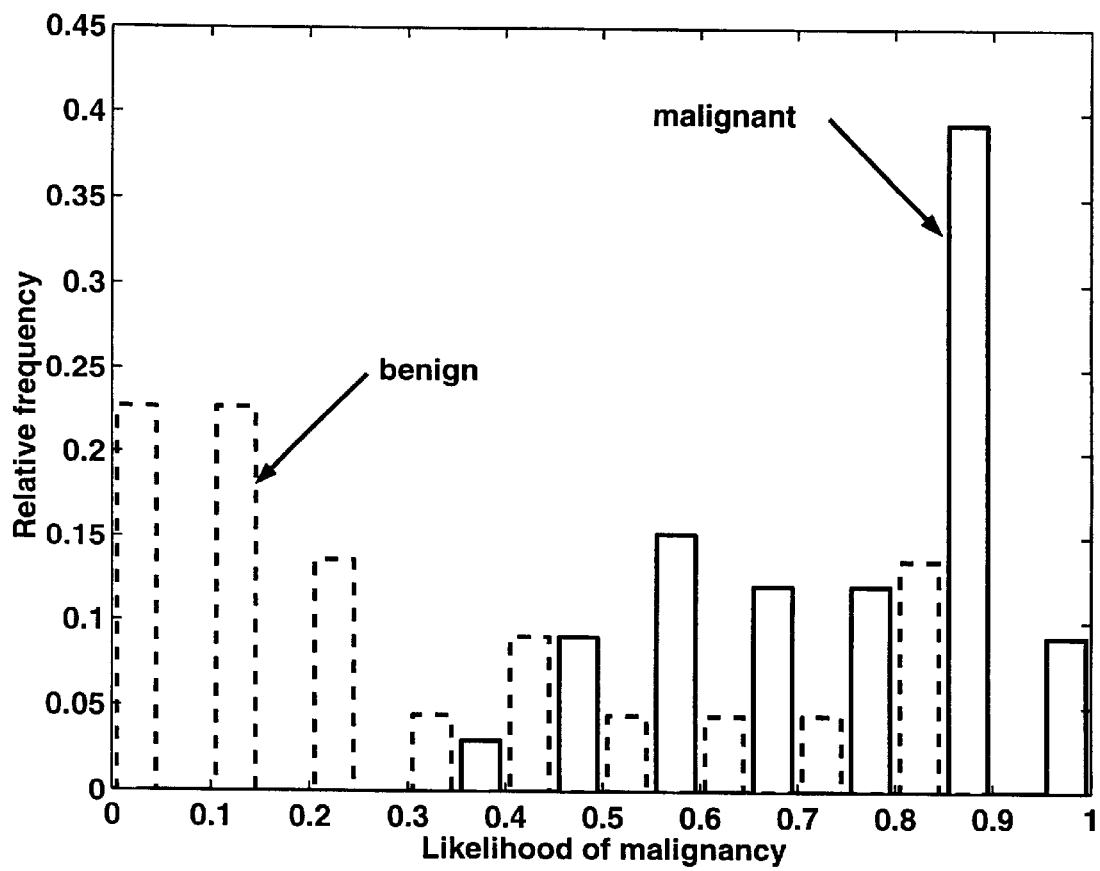
FIGS. 9(a) and 9(b) are a graphs illustrating distributions of (a) ANN output and (b) LDA output, respectively, indicating the likelihood of malignancy, obtained with the selected seven features for benign and malignant cases.
Figure 9B:
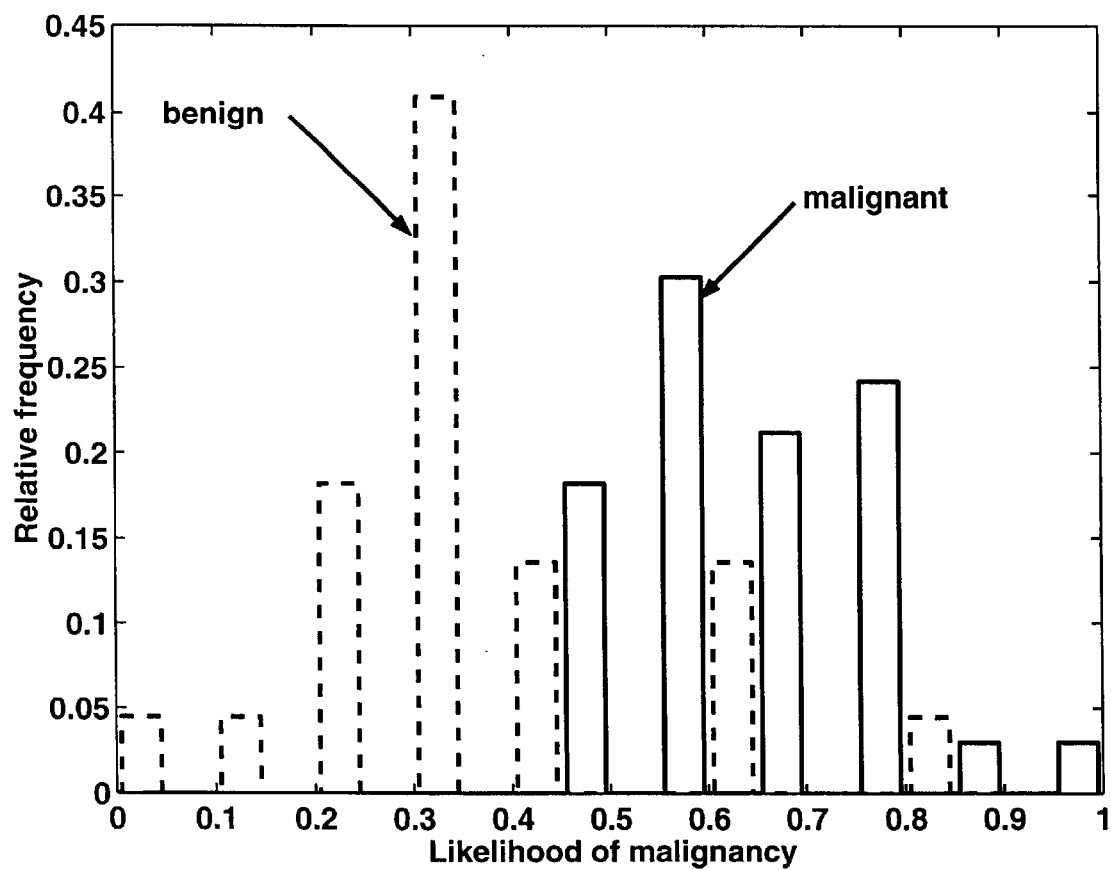

The largest Az obtained with the selected seven features by using LDA was 0.886. The largest Az by using the ANN was 0.872, which is greater than Az=0.854 obtained with the manual method in the previous study (see Reference 2 and PCT/US99/25998), whereas the Az of the LDA with the same feature combination (combination a(1,2,3,4,5,6,7) in Table 1) was 0.871. Five other combinations with the seven different features in Table 1 provided similar Az values, although the Az of LDA was slightly greater than the Az of the ANN. Note that only the ANN was used in our previous study (see Reference 2 and PCT/US99/25998). FIG. 9(a) shows the distribution of the ANN output in terms of the likelihood of malignancy, whereas FIG. 9(b) shows the distribution of the LDA output.

The likelihood of malignancy obtained with the ANN classifier for the three malignant nodules illustrated in FIGS. 1(a), 1(b), and 1(c) was 0.87, 0.83, and 0.35, respectively, and for the three benign nodules illustrated in FIGS. 1(c), 1(d), and 1(e) was 0.16, 0.21, and 0.77, respectively. These results indicate the correct likelihood of malignancy for two malignant nodules and two benign nodules, whereas the likelihoods of malignancy of one malignant nodule (c) and one benign nodule (f) were undesirable values for distinction between benign and malignant nodules. The likelihood of malignancy obtained with the LDA classifier for the three malignant nodules illustrated in FIGS. 1(a), 1(b), and 1(c) was 0.65, 0.66, and 0.45, respectively, and for the three benign nodules illustrated in FIGS. 1(c), 1(d), and 1(e) was 0.41, 0.38, and 0.48, respectively. It is apparent that there is a difference in the likelihood of malignancy between the ANN and LDA, although the overall results are comparable.

The likelihood of malignancy with LDA tends to be less definitive, because the likelihood values are closer to 0.5 for both malignant and benign nodules. The likelihood value for one benign nodule in FIG. 1(f) with LDA is 0.48, which is more reliable than the 0.77 obtained with the ANN. It is therefore preferred to use both results of the likelihood of malignancy by the ANN and LDA, and to display to the radiologist superimposed on each image two values, one obtained by the ANN and one obtained by the LDA, for the likelihood of malignancy. This is because the two results tend to indicate a range of the likelihood of malignancy as determined by the two classifiers, which appear to compensate for each other in providing a more reliable "second opinion."

Further commenting on the results obtained in the inventors' study, the Az of the ANN classifier as obtained with the selected seven features (1)–(7) for distinction between benign and malignant nodules was 0.872. The other five combinations with seven different features in Table 1 provided Az values above 0.855. This result seems to indicate that it is difficult to optimize the performance of the computerized scheme in distinguishing between benign and malignant nodules; also, a relatively high performance can be obtained with several different feature combinations. Because the inventors did not try to find the best combination exhaustively, it may be possible to improve the performance further with other combinations of existing features or by creating additional features in the future. In addition, LDA can be used instead of an ANN, as demonstrated by the inventors' result that LDA provided slightly larger Az values than did the ANN and LDA classifiers.

FIGS. 8, 9(a) and 9(b) demonstrate that method of the present invention will be useful in assisting radiologists in their distinction between benign and malignant nodules. The shape of the ROC curves obtained with ANN and LDA for distinction between benign and malignant nodules in FIG. 8 indicates that the false-positive fraction is about 0.5 and 0.4 at a true-positive fraction of 1.0, respectively. In fact, the likelihood of malignancy of ANN and LDA output for all malignant nodules was greater than 0.3 (FIG. 9(a)) and 0.4 (FIG. 9(b)), respectively. Therefore, a high sensitivity of 100% can be achieved by use of thresholds of 0.3 (ANN output) and 0.4 (LDA output). Accordingly, in step S90 of FIG. 10, each likelihood of malignancy output in step S80 is compared with a respective threshold, such as 0.3 for an ANN classifier output and 0.4 for an LDA classifier output, and in step S100, the nodule is determined to be non-malignant when each likelihood of malignancy is less than its respective threshold. In this way, with the ANN classifier alone, about 50% of benign nodules can be correctly identified without removal of any malignant nodules. If the LDA output is used as shown in FIGS. 8 and 9(b), it is possible to identify correctly about 60% of benign nodules. In the inventors manual method (see Reference 2 and PCT/US99/25998), the shape of the ROC curve was such that the false-positive fraction was almost 1.0 at a true-positive fraction of 1.0. This implies that it is difficult with the manual method to identify any benign nodules without removing any malignant nodules. With the new automated method, the performance for distinction between benign and malignant nodules is improved considerably.

The results obtained with the prior manual method (see Reference 2 and PCT/US99/25998) indicated that the Az value by the prior computerized scheme for distinguishing benign from malignant nodules was 0.854, which was greater than that (0.727) obtained by radiologists alone. It is important to note that the Az value obtained by radiologists was improved from 0.727 to 0.810 when the computer result (Az=0.854) obtained with the prior manual method (see Reference 2 and PCT/US99/25998) was presented to them as a second opinion. Therefore, it is expected that if the result (Az=0.872 and 0.886 by use of an ANN and LDA, respectively) obtained with the automated method of the present invention would be used in an observer study, the performance of radiologists would be further improved compared to the prior results.

Application to Other Imaging Modalities

The method of the present invention is also applicable to CT images and has been applied to determine the likelihood of malignancy of pulmonary nodules on low-dose helical CT. To that end, the inventors employed a database consisting of 76 primary lung cancers and 413 benign nodules, which were obtained from a lung cancer screening on 7,847 screenees with a low-dose helical CT (25–50 mAs, 10 mm collimation, pitch 2, 10 mm reconstruction interval) in Nagano, Japan. Primary lung cancers were proved by pathological diagnosis, and benign nodules were confirmed by diagnostic follow-up examinations or surgery. With this automated computerized scheme, the location of a nodule is first indicated by a radiologist. The nodule outline was determined automatically as above described, and forty-three image features were determined from quantitative analysis of the outline, texture, and gray-level histogram on the segmented nodule region. A linear discriminant analysis (LDA) was employed to distinguish benign from malignant nodules using 43 features and two clinical parameters (age and sex). The performance of our computerized scheme and radiologists in distinguishing benign from malignant nodules was evaluated by means of ROC analysis. Many different combinations of 45 features were examined as input to the LDA.

The most important features determined in the study, from the standpoint of best results in classifying CT nodules, were:

1. effective diameter of the nodule contour;
2. peak value for inside region of the segmented nodule on the edge; gradient image derived from the CT image;
3. sex of the patient;
4. relative standard deviation for inside region of the segmented nodule on the CT image;
5. peak value for inside region of the segmented nodule on the CT image;
6. difference of the mean pixel values for the inside and the outside regions of the segmented nodule on the edge gradient image derived from the CT image;
7. line pattern component for the outside region of the segmented nodule;
8. full width at tenth maximum for inside region of the segmented nodule on the CT image;
9. tangential gradient index for outside region of the segmented nodule; and
10. first moment of the power spectrum of the nodule contour.

Specific combinations, and the resulting Az values by use of LDA are shown in the following Table 2:

TABLE 2

| Feature Combination | Az for LDA |
| --- | --- |
| a(1,2,3,4,5) | 0.797 |
| b(1,2,3,4,6) | 0.796 |

TABLE 2-continued

| Feature Combination | Az for LDA |
|---|---|
| c(1,2,3,4,7) | 0.796 |
| d(1,2,3,6,8) | 0.795 |
| e(1,2,3,5,9) | 0.795 |
| f(1,2,4,5,10) | 0.795 |

As shown in Table 2, for combination (a), preliminary results indicated that the Az value obtained by the computerized scheme in distinguishing benign from malignant nodules was 0.797, which was greater than the Az value of 0.625 obtained by radiologist alone. Therefore, the automated computerized scheme for determination of the likelihood of nodule malignancy is useful in assisting radiologists in their task of distinguishing between benign and malignant solitary pulmonary nodules on low-dose helical CT.

Although the data of Table 2 only shows results obtained by LDA, similar results for ANN classification are expected, and likewise as in the case of x-ray radiography, it is expected that thresholding of outputs of LDA and ANN classifiers having CT derived features will enable the identification of a substantial percentage of non-malignant tumors, by which the avoidance of biopsy and/or additional imaging can be avoided.

Furthermore, as disclosed in the above-cross-referenced U.S. application Ser. No. 08/900,188 and U.S. Pat. No. 5,984,870, it is expected that the merging of features derived from two different imaging modalities, in this case chest x-ray radiography and CT, as inputs into a common classifier will also be useful in obtaining an improved Az value. To that end, according to a further embodiment of the present invention, there is provided a method including obtaining from chest x-ray radiography imaging and CT imaging modalities respective digital images of a same portion of the anatomy; identifying in the respective digital images a nodule common to each image; segmenting the nodule identified in each digital image to obtain an outline of the nodule in the respective image, including, for each digital image, generating a difference image from the digital image, identifying image intensity contour lines representative of respective image intensities in a region of interest including the nodule, and obtaining an outline of the nodule based on the image intensity contours; extracting, for each of said digital images, at least one feature of the nodule in the respective image based on the outline; merging plural features including the features extracted from the two digital images derived from chest x-ray radiography imaging and CT imaging modalities, as inputs to a common image classifier to characterize said nodule based on the merged plurality of extracted features and determine a likelihood of malignancy of the nodule based on an output of the common image classifier. It is anticipated that best results will be obtained by merging features above identified in regard to the chest x-ray and CT imaging modalities, with the features employed in Tables 1 and 2 giving best results using LDA or ANN classifiers.

Computer and System

This invention conveniently may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 11:
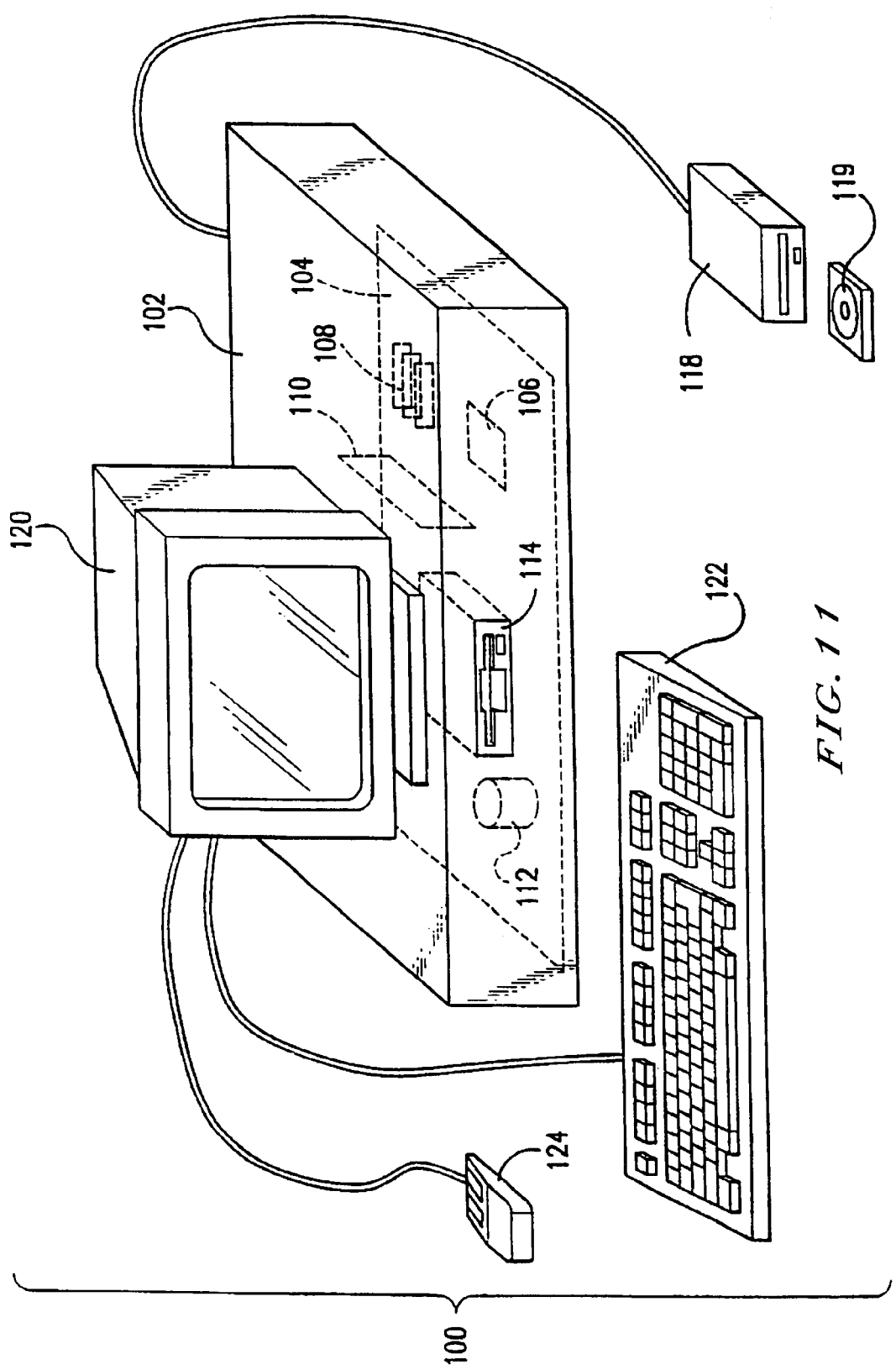
FIG. 11 is a schematic illustration of a general purpose computer 100 programmed according to the teachings of the present invention.

FIG. 11 is a schematic illustration of a computer system for the computerized analysis of the likelihood of malignancy in pulmonary nodules. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing the inventive method of FIG. 10. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States is:

1. A method for analyzing a pulmonary nodule, comprising:
  obtaining a digital image including the nodule;
  segmenting the nodule to obtain an outline of the nodule, comprising,
  generating a difference image from the digital image,
  identifying image intensity contour lines representative of respective image intensities in a region of interest including the nodule, and obtaining an outline of the nodule based on the image intensity contour lines.

2. The method of claim 1, wherein the obtaining an outline step comprises:

determining a band of contours including at least three adjacent contours which are separated from each other by less than a predetermined distance, and identifying the nodule outline as being within said band of contours.

3. The method of claim 2, wherein the obtaining an outline step comprises:

determining at least a portion of said outline to be at an upper location from the bottom to the top of the band.

4. The method of claim 3, wherein the obtaining an outline step comprises:

determining at least a portion of said outline to be at an upper 70% location from the bottom to the top of the band.

5. The method of claim 1, further comprising:

extracting features of the nodule based on the outline;

applying features including the extracted features to at least one image classifier; and determining a likelihood of malignancy of the nodule based on an output of the at least one image classifier.

6. The method of claim 1, further comprising:

extracting features of the nodule based on the outline;

applying features including the extracted features to an artificial neural network classifier; and determining a likelihood a malignancy of the nodule based on an output of the artificial neural network classifier.

7. The method of claim 6, wherein said determining a likelihood of malignancy step comprises:

comparing the output of the artificial neural network classifier with a predetermined threshold; and comparing the output of the artificial neural network classifier with a predetermined threshold; and determining the nodule to be non-malignant when the output of the artificial neural network classifier is less than said predetermined threshold.

8. The method of claim 1, further comprising:

extracting features of the nodule based on the outline;

applying features including the extracted features to a linear discriminant analysis classifier; and determining a likelihood of malignancy of the nodule based on an output of the linear discriminant analysis classifier.

9. The method of claim 8, wherein said determining a likelihood of malignancy step comprises:

comparing the output of the linear discriminant analysis classifier with a predetermined threshold; and determining the nodule to be non-malignant when the output of the linear discriminant analysis classifier is less than said predetermined threshold.

10. The method of claim 1, further comprising:

extracting features of the nodule based on the outline;

applying features including the extracted features to an artificial neural network classifier and to a linear discriminant analysis classifier; and determining a likelihood of malignancy of the nodule based on outputs of the artificial neural network classifier and the linear discriminant analysis classifier.

11. The method of claim 10, wherein said determining a likelihood of malignancy step comprises:

comparing the outputs of the artificial neural network classifier and the linear discriminant analysis classifier with respective predetermined thresholds; and determining the nodule to be non-malignant when both the outputs of the artificial neural network classifier and the linear discriminant analysis classifier are less than said respective predetermined thresholds.

12. The method of claims 6, 7, 8, 9, 10, or 11, wherein:

the step of obtaining a digital image comprises obtaining a digital chest radiographic image including the nodule; and the applying step comprises applying plural of the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (6) FWHM for the inside region of the segmented nodule on the background trend and the density-corrected image derived from the original image, (7) FWHM for the inside region of the segmented nodule on the original image, (8) contrast of the segmented nodule on the background trend and the density-corrected image derived from the original image, (9) contrast of the segmented nodule on the original image, (10) degree of circularity of the nodule outline, (11) relative standard deviation for outside region of the segmented nodule on the background trend and the density-corrected image derived from the original image, and (12) mean pixel value for inside region of the segmented nodule on the background trend and the density-corrected image derived from the original image.

13. The method of claim 12, wherein:

the applying step comprises applying each of the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (6) FWHM for the inside region of the segmented nodule on the background trend and the density-corrected image derived from the original image, and (7) FWHM for the inside region of the segmented nodule on the original image.

14. The method of claim 12, wherein:

the applying step comprises applying each of the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (7) FWHM for the inside region of the segmented nodule on the original image, (8) contrast of the segmented nodule on the background trend and the density-corrected image derived from the original image.

15. The method of claim 12, wherein:

the applying step comprises applying each of the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (8) contrast of the segmented nodule on the background trend and the density-corrected image derived from the original image, and (9) contrast of the segmented nodule on the original image.

16. The method of claim 12, wherein:

the applying step comprises applying each of the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (6) FWHM for the inside region of the segmented nodule on the background trend and the density-corrected image derived from the original image, (7) FWHM for the inside region of the segmented nodule on the original image, and (10) degree of circularity of the nodule outline.

17. The method of claim 8, wherein:

the applying step comprises applying the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (8) contrast of the segmented nodule on the background trend and the density-corrected image derived from the original image, and (11) relative standard deviation for outside region of the segmented nodule on the background trend and the density-corrected image derived from the original image.

18. The method of claim 12, wherein:

the applying step comprises applying the following features: (1) age, (2) root-mean square variation of the power spectrum of the nodule contour, (3) overlap measure in the background trend and the density-corrected image derived from the original image, (4) FWHM for the outside region of the segmented nodule on the background trend and the density-corrected image derived from the original image, (5) degree of irregularity of the nodule outline, (7) FWHM for the inside region of the segmented nodule on the original image, and (12) mean pixel value for inside region of the segmented nodule on the background trend and the density-corrected image derived from the original image.

19. The method of claim 8, wherein the applying step further comprises:

applying to the at least one image classifier at least one clinical parameter corresponding to the nodule.

20. The method of claim 19, wherein the step of applying the at least one clinical parameter comprises:

selecting the at least one clinical parameter from the group consisting essentially of age and gender.

21. The method of claims 6, 7, 8, 9, 10 or 11, wherein:

the step of obtaining a digital image comprises obtaining a CT image including the nodule; and the applying step comprises applying plural of the following features: (1) effective diameter of the nodule contour; (2) peak value for inside region of the segmented nodule on the edge gradient image derived from the CT image; (3) sex of the patient; (4) relative standard deviation for inside region of the segmented nodule on the CT image; (5) peak value for inside region of the segmented nodule on the CT image; (6) difference of the mean pixel values for the inside and the outside regions of the segmented nodule on the edge gradient image derived from the CT image; (7) line pattern component for the outside region of the segmented nodule; (8) full width at tenth maximum for inside region of the segmented nodule on the CT image; (9) tangential gradient index for outside region of the segmented nodule; and (10) first moment of the power spectrum of the nodule contour.

22. The method of claim 21, wherein:

the applying step comprises applying each of the following features: (1) effective diameter of the nodule contour; (2) peak value for inside region of the segmented nodule on the edge gradient image derived from the CT image; (3) sex of the patient; (4) relative standard deviation for inside region of the segmented nodule on the CT image; and (5) peak value for inside region of the segmented nodule on the CT image.

23. The method of claim 21, wherein:

the applying step comprises applying each of the following features: (1) effective diameter of the nodule contour; (2) peak value for inside region of the segmented nodule on the edge gradient image derived from the CT image; (3) sex of the patient; (4) relative standard deviation for inside region of the segmented nodule on the CT image; and (6) difference of the mean pixel values for the inside and the outside regions of the segmented nodule on the edge gradient image derived from the CT image.

24. The method of claim 21, wherein:

the applying step comprises applying each of the following features: (1) effective diameter of the nodule contour; (2) peak value for inside region of the segmented nodule on the edge gradient image derived from the CT image; (3) sex of the patient; (4) relative standard deviation for inside region of the segmented nodule on the CT image; and (7) line pattern component for the outside region of the segmented nodule.

25. The method of claim 21, wherein:

the applying step comprises applying each of the following features: (1) effective diameter of the nodule contour; (2) peak value for inside region of the segmented nodule on the edge gradient image derived from the CT image; (3) sex of the patient; (6) difference of the mean pixel values for the inside and the outside regions of the segmented nodule on the edge gradient image derived from the CT image; and (8) full width at tenth maximum for inside region of the segmented nodule on the CT image.

26. The method of claim 21, wherein:

the applying step comprises applying each of the following features: (1) effective diameter of the nodule contour; (2) peak value for inside region of the segmented nodule on the edge gradient image derived from the CT image; (3) sex of the patient; (5) peak value for inside region of the segmented nodule on the CT image; and (9) tangential gradient index for outside region of the segmented nodule.

27. The method of claim 21, wherein:

the applying step comprises applying each of the following features: (1) effective diameter of the nodule contour; (2) peak value for inside region of the segmented nodule on the edge gradient image derived from the CT image; (4) relative standard deviation for inside region of the segmented nodule on the CT image; (5) peak value for inside region of the segmented nodule on the CT image; and (10) first moment of the power spectrum of the nodule contour.

28. The method of any one of claims 1–5, comprising:

said step of obtaining a digital image including a nodule comprising obtaining from x-ray imaging and CT imaging modalities respective digital images of a same portion of the anatomy in which a common nodule is identified in each image;

said segmenting step comprising segmenting the nodule identified in each digital image to obtain an outline of the nodule in each respective image;

extracting, for each of said digital images, at least one feature of the nodule in the respective image based on the outline; and merging plural features including the features extracted from the two digital images derived from x-ray imaging and CT imaging modulaties, as inputs to a common image classifier to characterize said nodule based on the merged plurality of extracted features and determine a likelihood of malignancy of the nodule based on an output of the common image classifier.

29. A computer readable medium storing computer program instructions for analyzing a nodule, which when used to program a computer cause the computer to perform the steps of any one of claims 19 and 20.

30. A computer readable medium storing computer program instructions for analyzing a nodule, which when used to program a computer cause the computer to perform the steps of claim 12.

31. A computer readable medium storing computer program instructions for analyzing a nodule, which when used to program a computer cause the computer to perform the steps of claim 13.

32. A computer readable medium storing computer program instructions for analyzing a nodule, which when used to program a computer cause the computer to perform the steps of claim 14.

33. A computer readable medium storing computer program instructions for analyzing a nodule, which when used to program a computer cause the computer to perform the steps of claim 15.

34. A computer readable medium storing computer program instructions for analyzing a nodule, which when used to program a computer cause the computer to perform the steps of claim 17.

35. A computer readable medium storing computer program instructions for analyzing a nodule, which when used to program a computer cause the computer to perform the steps of claim 17.

36. A computer readable medium storing computer program instructions for analyzing a nodule, which when used to program a computer cause the computer to perform the steps of claim 18.

37. A computer readable medium storing computer program instructions for analyzing a nodule, which when used to program a computer cause the computer to perform the steps of claim 21.

38. A computer readable medium storing computer program instructions for analyzing a nodule, which when used to program a computer cause the computer to perform the steps of claim 22.

39. A computer readable medium storing computer program instructions for analyzing a nodule, which when used to program a computer cause the computer to perform the steps of claim 23.

40. A computer readable medium storing computer program instructions for analyzing a nodule, which when used to program a computer cause the computer to perform the steps of claim 24.

41. A computer readable medium storing computer program instructions for analyzing a nodule, which when used to program a computer cause the computer to perform the steps of claim 25.

42. A computer readable medium storing computer program instructions for analyzing a nodule, which when used to program a computer cause the computer to perform the steps of claim 26.

43. A computer readable medium storing computer program instructions for analysing a nodule, which when used to program a computercause the computer to perform thesteps of claim 27.

44. A computer readable medium storing computer program instructions for analysing a nodule, which when used to program a computercause the computer to perform thesteps of claim 28.

* * * * *